United States Patent
Vilaipornsawai et al.

(10) Patent No.: US 11,050,525 B2
(45) Date of Patent: Jun. 29, 2021

(54) SYSTEM AND METHOD FOR CONTROL AND DATA CHANNEL RELIABILITY ENHANCEMENT USING MULTIPLE DIVERSITY DOMAINS

(71) Applicant: HUAWEI TECHNOLOGIES CO., LTD., Guangdong (CN)

(72) Inventors: Usa Vilaipornsawai, Nepean (CA); Yongxia Lyu, Ottawa (CA); Mohammadhadi Baligh, Ottawa (CA); Liqing Zhang, Ottawa (CA); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/578,556

(22) Filed: Sep. 23, 2019

(65) Prior Publication Data

US 2020/0106559 A1 Apr. 2, 2020

Related U.S. Application Data

(60) Provisional application No. 62/737,734, filed on Sep. 27, 2018.

(51) Int. Cl.
*H04L 1/18* (2006.01)
*H04W 72/04* (2009.01)
*H04L 1/08* (2006.01)
*H04L 5/00* (2006.01)

(52) U.S. Cl.
CPC ............ *H04L 1/189* (2013.01); *H04L 1/08* (2013.01); *H04L 5/0023* (2013.01); *H04W 72/042* (2013.01)

(58) Field of Classification Search
None
See application file for complete search history.

(56) References Cited

U.S. PATENT DOCUMENTS

| 2009/0274233 A1 * | 11/2009 | Niu ................ H04L 27/2676 375/267 |
| 2013/0272110 A1 | 10/2013 | Eriksson et al. |
| 2015/0305003 A1 | 10/2015 | Chen et al. |

(Continued)

FOREIGN PATENT DOCUMENTS

| CN | 101572592 A | 11/2009 |
| CN | 104756570 A | 7/2015 |
| CN | 106452661 A | 2/2017 |

OTHER PUBLICATIONS

Considerations for DL automatic repetition, 3GPP TSG RAN WG1 Meeting #94, R1-1809317, Gothenburg, Sweden, Aug. 20-24, 2018.

(Continued)

*Primary Examiner* — Anh Ngoc M Nguyen

(57) ABSTRACT

A method of using multiple diversity domains for data repetition is provided. A diversity mode indicator is set to one diversity mode indicator value of a plurality of diversity mode indicator values. Each diversity indicator value is associated with a respective combination of one or more diversity domains for data repetition. Following that, transmitting or receiving a plurality of repetitions is performed based on the one diversity mode indicator value. For at least one of the diversity mode indicator values, the respective combination of one or more diversity domains for repetition comprises space.

20 Claims, 15 Drawing Sheets

(56) References Cited

U.S. PATENT DOCUMENTS

2017/0054479 A1* 2/2017 Sang ................... C25D 3/30
2017/0265174 A1* 9/2017 Wang ................... H04L 1/08
2018/0219649 A1* 8/2018 Ying .................... H04L 1/1816

OTHER PUBLICATIONS

NTT Docomo, Inc., "Physical Layer Enhancements for NR URLLC", 3GPP TSG RAN WG1 Meeting #94, R1-1809163, Gothenburg, Sweden, Aug. 20-24, 2018.

* cited by examiner

| TCI Configuration | TCI Pattern |
|---|---|
| 0 | TCIStateID1, TCIStateID2 |
| 1 | TCIStateID2, TCIStateID3 |
| 2 | TCIStateID1, TCIStateID3, TCIStateID2 |
| 3 | TCIStateID1, TCIStateID1, TCIStateID2, TCIStateID2 |

FIG. 13A

| AP Configuration | AP Pattern |
|---|---|
| 0 | AP value1, AP value2 |
| 1 | AP value2, AP value3 |
| 2 | AP value1, AP value3, AP value2 |
| 3 | AP value1, AP value1, AP value2, AP value2 |

FIG. 13B

| TCI Configuration | TCI Pattern | AP Pattern |
|---|---|---|
| 0 | TCIStateID1, TCIStateID2 | AP value1, AP value2 |
| 1 | TCIStateID2, TCIStateID3 | AP value2, AP value3 |
| 2 | TCIStateID1, TCIStateID3, TCIStateID2 | AP value1, AP value3, AP value2 |
| 3 | TCIStateID1, TCIStateID2, TCIStateID2 | AP value1, AP value1, AP value2, AP value2 |

| MCS Configuration | MCS Pattern |
|---|---|
| 0 | MCS value1, MCS value2 |
| 1 | MCS value2, MCS value3 |
| 2 | MCS value1, MCS value3, MCS value2 |
| 3 | MCS value1, MCS value1, MCS value2, MCS value2 |

| DMRS Configuration | DMRS Pattern |
|---|---|
| 0 | DMRS value1, DMRS value2 |
| 1 | DMRS value2, DMRS value3 |
| 2 | DMRS value1, DMRS value3, DMRS value2 |
| 3 | DMRS value1, DMRS value1, MDMRS value2, DMRS value2 |

# SYSTEM AND METHOD FOR CONTROL AND DATA CHANNEL RELIABILITY ENHANCEMENT USING MULTIPLE DIVERSITY DOMAINS

CROSS REFERENCE

This application claims the benefit of U.S. Provisional Patent Application No. 62/737,734 filed Sep. 27, 2018, which is hereby incorporate by reference in its entirety.

FIELD

The application relates to retransmission schemes for control and data that employ multiple diversity domains.

BACKGROUND

To achieve very stringent ultra-reliable low latency communication (URLLC) requirements (for example, 1 ms latency, 1E-6 block error rate (BLER) reliability), downlink data transmissions and uplink data transmissions, for example using a physical downlink shared channel (PDSCH) and a physical uplink shared channel (PUSCH), can be made with repetition using multiple domains (for example, time, spatial, frequency domains).

There are many schemes that have been proposed, but there is no detailed signaling design on how different repetitions (with different redundancy versions (RVs)) correspond to which domains. For example, for a situation where spatial and time domains are used for data transmission, there is no signaling to indicate whether the spatial domain repetition occurs first followed by time, or vice versa.

For example, PUSCH repetition using different quasi co-located (QCL) indicators/precoders/beams has been proposed, but there is no detail on signaling.

For enhanced reliability, in addition to repeating data, control channel transmissions, for example, physical downlink control channel (PDCCH) transmissions, are also repeated.

PDCCH repetitions over time/spatial/frequency domains have been proposed. In existing proposals, a downlink control information (DCI) repetition index is explicitly included in the DCI so that PDSCH associated with previously missed DCI can be used for PDSCH soft combining.

It would be beneficial to have more flexibility in performing repetitions in multiple diversity domains, and to have a detailed signaling scheme in respect of such transmissions.

SUMMARY

According to one aspect of the present application, there is provided a method for data repetition, the method comprising: setting a repetition mode indicator to indicate a space domain repetition mode; and transmitting or receiving at least one repetition of a wireless transmission according to the indicated space domain repetition mode.

Optionally, the method further comprises: setting a second repetition mode indicator to indicate a frequency domain repetition mode; and transmitting or receiving said at least one repetition of a wireless transmission according to the indicated space domain repetition mode and the indicated frequency domain repetition mode.

Optionally, the method further comprises: setting a second repetition mode indicator to indicate a time domain repetition mode; and transmitting or receiving said at least one repetition of a wireless transmission according to the indicated space domain repetition mode and the indicated time domain repetition mode.

Optionally, method performed by a user equipment, wherein transmitting or receiving at least one repetition of a wireless transmission according to the indicated space domain repetition mode comprises: the user equipment receiving two spatially diverse repetitions.

Optionally, the method is performed by a user equipment, and transmitting or receiving at least one repetition of a wireless transmission according to the indicated space domain repetition mode comprises: the user equipment receiving four repetitions, the transmission comprising two transmissions using two different frequency resources.

Optionally, the method is performed by a user equipment, and transmitting or receiving at least one repetition of a wireless transmission according to the indicated space domain repetition mode comprises: the user equipment receiving four repetitions, the transmission comprising two transmissions using two different time resources.

Optionally, the method is performed by a transmit receive point, and transmitting or receiving at least one repetition of a wireless transmission according to the indicated space domain repetition mode comprises a TRP transmitting two repetitions using two different frequency resources.

Optionally, the method is performed by a user equipment, and the method further comprises: receiving the first repetition mode indicator.

Optionally, the method is performed by a transmit receive point, and the method further comprises: transmitting the first repetition mode indicator.

According to one aspect of the present invention, there is provided base station comprising: a processor; a memory containing instructions for causing the base station to implement a method comprising: setting a repetition mode indicator to indicate a space domain repetition mode; and transmitting or receiving at least one repetition of a wireless transmission according to the indicated space domain repetition mode.

Optionally, the memory further contains instructions for causing the base station to: set a second repetition mode indicator to indicate a frequency domain repetition mode; and transmit or receiving said at least one repetition of a wireless transmission according to the indicated space domain repetition mode and the indicated frequency domain repetition mode.

Optionally, the memory further contains instructions for causing the base station to: set a second repetition mode indicator to indicate a time domain repetition mode; and transmit or receiving said at least one repetition of a wireless transmission according to the indicated space domain repetition mode and the indicated time domain repetition mode.

Optionally, the base station is configured to transmit or receive at least one repetition of a wireless transmission according to the indicated space domain repetition mode by transmitting two repetitions using two different frequency resources.

Optionally, the memory further contains instructions for causing the base station to: transmit the first repetition mode indicator.

According to another aspect of the present invention, there is provided user equipment comprising: a processor; a memory containing instructions for causing the user equipment to implement a method comprising: setting a repetition mode indicator to indicate a space domain repetition mode; and transmitting or receiving at least one repetition of a wireless transmission according to the indicated space domain repetition mode.

Optionally, the memory further contains instructions for causing the user equipment to: set a second repetition mode indicator to indicate a frequency domain repetition mode; and transmit or receive said at least one repetition of a wireless transmission according to the indicated space domain repetition mode and the indicated frequency domain repetition mode.

Optionally, the memory further contains instructions for causing the user equipment to: set a second repetition mode indicator to indicate a time domain repetition mode; and transmit or receiving said at least one repetition of a wireless transmission according to the indicated space domain repetition mode and the indicated time domain repetition mode.

Optionally, transmitting or receiving at least one repetition of a wireless transmission according to the indicated space domain repetition mode comprises the user equipment receiving two spatially diverse repetitions.

Optionally, transmitting or receiving at least one repetition of a wireless transmission according to the indicated space domain repetition mode comprises: the user equipment receiving four repetitions, the transmission comprising two transmissions using two different frequency resources.

Optionally, transmitting or receiving at least one repetition of a wireless transmission according to the indicated space domain repetition mode comprises the user equipment receiving four repetitions, the transmission comprising two transmissions using two different time resources.

Optionally, the user equipment is further configured to receive the first repetition mode indicator.

According to one aspect of the present application, there is provided a method of using multiple diversity domains for data repetition, the method comprising: setting a diversity mode indicator to one diversity mode indicator value of a plurality of diversity mode indicator values, wherein: each diversity indicator value is associated with a respective combination of one or more diversity domains for data repetition; and transmitting or receiving a plurality of repetitions based on the one diversity mode indicator value; wherein for at least one of the diversity mode indicator values, the respective combination of one or more diversity domains for repetition comprises space.

Optionally, each diversity indicator value indicates the order that repetitions take place using the respective combination of one or more diversity domains.

Optionally, the plurality of diversity mode indicator values comprise one or more of: at least one diversity mode indicator value associated with repetition in time and space; at least one diversity mode indicator value associated with repetition in space; at least one diversity mode indicator value associated with repetition in frequency and space; at least one diversity mode indicator value associated with repetition in time, frequency and space.

Optionally, the plurality of diversity mode indicator values comprise: at least one diversity mode indicator value associated with repetition in time and frequency.

Optionally, the plurality of diversity mode indicator values comprise: at least one diversity mode indicator value associated with repetition in time.

Optionally, the plurality of diversity mode indicator values comprise: at least one diversity mode indicator value associated with repetition in space and time.

Optionally, a fallback mode that uses repetition in space only is employed when not enough repetitions are configured to allow repetition in time and space.

Optionally, the method further comprises signaling a value N indicating how many repetitions are to be transmitted or received.

Optionally, the method further comprises setting at least one value for each of the at least one diversity domain associated with the one diversity mode indicator value indicating resources within that diversity domain that are to be used for repetition in that diversity domain.

Optionally, setting at least one value comprises one or a combination of: using at least one predefined value associated with the one diversity mode indicator value; transmitting or receiving the at least one value using dynamic signaling; transmitting or receiving the at least one value using higher layer signaling.

Optionally, when the at least one diversity domain includes time, the at least one value indicates time units during which repetitions in time are to occur.

Optionally, when the at least one diversity domain includes frequency, the at least one value indicates frequencies with which repetitions in frequency are to occur.

Optionally, when the at least one diversity domain includes space, the at least one value indicates spatial information for which repetitions in space are to occur.

Optionally, the method further comprises setting the rules that specify behavior for data repetition in terms of the order that repetitions take place using the associated diversity domains of the one diversity domain indicator value by one or a combination of: using at least one predefined rule associated with the one diversity indicator value; transmitting or receiving dynamic signaling indicating at least one of the rules; transmitting or receiving higher layer signaling indicating at least one of the rules.

Optionally, transmitting or receiving a plurality of repetitions based on the diversity mode indicator value comprises: transmitting or receiving repetitions in respect of a fallback diversity mode associated with the one diversity mode indicator value when insufficient values for at least one diversity domain have been set for the one diversity domain indicator value.

Optionally, the method further comprises setting the plurality of diversity mode indicator values by one or a combination of: using predefined information; transmitting or receiving dynamic signaling; transmitting or receiving higher layer signaling.

Optionally, the method further comprises defining the association between each of the plurality of diversity mode indicator values with the respective combination of one or more diversity domains for data repetition and with the respective rules that specify behavior for data repetition in terms of the order that repetitions take place using the respective combination of one or more diversity domains by: using predefined information; transmitting or receiving dynamic signaling; transmitting or receiving higher layer signaling.

According to another aspect of the present application, there is provided the method as described herein performed by a base station.

According to another aspect of the present application, there is provided a base station comprising: a processor; a memory containing instructions for causing the base station to implement the method as described herein.

According to another aspect of the present application, there is provided a method as described herein performed by a user equipment.

According to another aspect of the present application, there is provided a user equipment comprising: a processor; a memory containing instructions for causing the user equipment to implement the method as described herein.

According to another aspect of the present application, there is provided a method comprising: for each of a plurality of repetitions having a respective repetition number: scrambling a respective downlink control information using a respective identifier that is tied to the repetition number; transmitting the respective downlink control information; and transmitting a respective data repetition.

Optionally, scrambling a respective downlink control information using a respective identifier that is tied to the repetition number comprises using an identifier g(RNTI, f(i)), where: i is the repetition number; f(i) is a one to one function of i; RNTI is the radio network temporary identifier; g is a function of RNTI and f(i).

Optionally, f(i)=i*offset, such that the set of f(i) are equally spaced.

Optionally, f(i)=offset_i, where offset_i is independently set for each i.

Optionally, g(RNTI, f(i)) is a linear function with respect to RNTI and f(i) in a Galois Field.

Optionally, the method further comprises configuring the respective identifiers using one or a combination of: using predefined information; transmitting dynamic signaling; transmitting higher layer signaling.

Optionally, each downlink control information is transmitted using a respective different control resource set.

Optionally, the method further comprises transmitting an indication of a redundancy version sequence to use in transmitting the plurality of repetitions.

Optionally, transmitting the respective downlink control information comprises using a control channel element associated with the repetition number.

According to another aspect of the present application, there is provided a method comprising: for each of a plurality of repetitions having a respective repetition number: transmitting the respective downlink control information using a control channel element associated with the repetition number; and transmitting a respective data repetition.

According to another aspect of the present application, there is provided the method as described above performed by a base station.

According to another aspect of the present application, there is provided a base station comprising: a processor; a memory containing instructions for causing the base station to implement the method as described herein.

According to another aspect of the present application, there is provided a method comprising: for at least one repetition associated with a respective repetition number: receiving a respective downlink control information scrambled using a respective identifier that is tied to the repetition number; receiving a respective data repetition; determining the respective identifier used to scramble the respective downlink control information; determining the repetition number from the respective identifier; based on the determined repetition number, determining if a previous repetition was missed, and if so attempting to process the missed repetition by performing soft combining between the missed repetition and the at least one repetition.

Optionally, the respective downlink control information is tied to the repetition number according to identifier g(RNTI, f(i)), where: i is the repetition number; f(i) is a one to one function of i; RNTI is the radio network temporary identifier; g is a function of RNTI and f(i).

Optionally, f(i)=i*offset, such that the set of f(i) are equally spaced.

Optionally, wherein f(i)=offset_i, where offset_i is independently set for each i.

Optionally, the method further comprises configuring the respective identifiers using one or a combination of: using predefined information; receiving dynamic signaling; receiving higher layer signaling.

Optionally, each downlink control information is received using a respective different control resource set.

Optionally, the method further comprises receiving an indication of a redundancy version sequence to use in receiving the plurality of repetitions.

Optionally, receiving the respective downlink control information comprises using a control channel element associated with the repetition number.

According to another aspect of the present application, there is provided a method comprising: for at least one repetition associated with a respective repetition number: receiving a respective downlink control information scrambled using a control channel element that is associated with the repetition number; receiving a respective data repetition; determining the repetition number from the control channel element used for the downlink control information; based on the determined repetition number, determining if a previous repetition was missed, and if so attempting to process the missed repetition by performing soft combining between the missed repetition and the at least one repetition.

According to another aspect of the present application, there is provided the method as described above performed by a user equipment.

According to another aspect of the present application, there is provided a user equipment comprising: a processor; a memory containing instructions for causing the user equipment to implement the method as described herein.

According to another aspect of the present application, there is provided a method comprising: transmitting or receiving a plurality of repetitions with at least one diversity domain based on a diversity mode indicator value, the at least one diversity domain including spatial domain diversity.

Optionally, the diversity mode indicator value indicates behavior for data repetition in terms of the order that repetitions take place using the at least one diversity domain.

Optionally, the diversity mode indicator value is one of: a diversity mode indicator value associated with repetition in time and space; a diversity mode indicator value associated with repetition in space only; a diversity mode indicator value associated with repetition in frequency and space; a diversity mode indicator value associated with repetition in time, frequency and space.

Optionally, the diversity mode indicator value is associated with repetition in time and space.

Optionally, the rules associated with the diversity mode indicator value indicate repetition in space and time such that the nth repetition, n=0, 1, . . . N−1 is associated with spatial relevant information first, and then time instants such that a first K repetitions are transmitted during a first time instant using K different spatial relevant information, a next K repetitions are transmitted during a second time instant using the K different spatial relevant information and so on until the N repetitions are complete.

Optionally, the rules associated with the diversity mode indicator value indicate repetition in space and time such that the nth repetition, n=0, 1, . . . N−1 is associated with time instants first and then associated with spatial relevant information such that N repetitions are transmitted during N time instants using respective ones of the K different spatial relevant information.

Optionally, the method further comprises setting at least one value for each of the at least one diversity domains indicating resources within that diversity domain that are to be used for repetition in that diversity domain.

Optionally, setting at least one value comprises one or a combination of: using at least one predefined value associated with one diversity mode indicator value; transmitting or receiving the at least one value using dynamic signaling; transmitting or receiving the at least one value using higher layer signaling.

Optionally, the method further comprises setting the rules that specify behavior for data repetition in terms of the order that repetitions take place using the at least one diversity domain of the diversity domain indicator value by one or a combination of: using at least one predefined rule associated with the diversity indicator value; transmitting or receiving dynamic signaling indicating at least one of the rules; transmitting or receiving higher layer signaling indicating at least one of the rules.

Optionally, transmitting or receiving a plurality of repetitions based on the diversity mode indicator value comprises: transmitting or receiving repetitions in respect of a fallback diversity mode associated with the diversity mode indicator value when insufficient values for at least one diversity domain have been set for the diversity domain indicator value.

Optionally, the at least one diversity domain comprises time and space, and wherein a fallback mode that uses repetition in space only is employed when not enough repetitions are configured to allow repetition in time and space.

Optionally, the rules are initially a set of default rules, the method further comprising: using RRC signaling to configure a different set of rules.

Optionally, the method further comprises transmitting or receiving signaling UE to configure UE with a plurality of groups of TCI states or predefining a plurality of groups of TCI states; using dynamic signaling to indicate one of the groups of TCI states from the plurality of group of TCI states, the one group of TCI states corresponding to spatial information for use for spatial diversity.

Optionally, spatial domain diversity is activated by default.

Optionally, the method further comprises transmitting or receiving signaling UE to configure UE with a plurality of groups of precoders or predefining a plurality of groups of precoders; using dynamic signaling to indicate one of the groups of precoders from the plurality of group of precoders, the one group of precoders corresponding to spatial information for use for spatial diversity.

BRIEF DESCRIPTION OF THE DRAWINGS

Embodiments of the disclosure will now be described with reference to the attached drawings in which:

FIG. 13A is an example table illustrating precoding information patterns with associated configuration indices according to an aspect of the disclosure.

FIG. 13B is an example table illustrating AP patterns with associated configuration indices according to an aspect of the disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
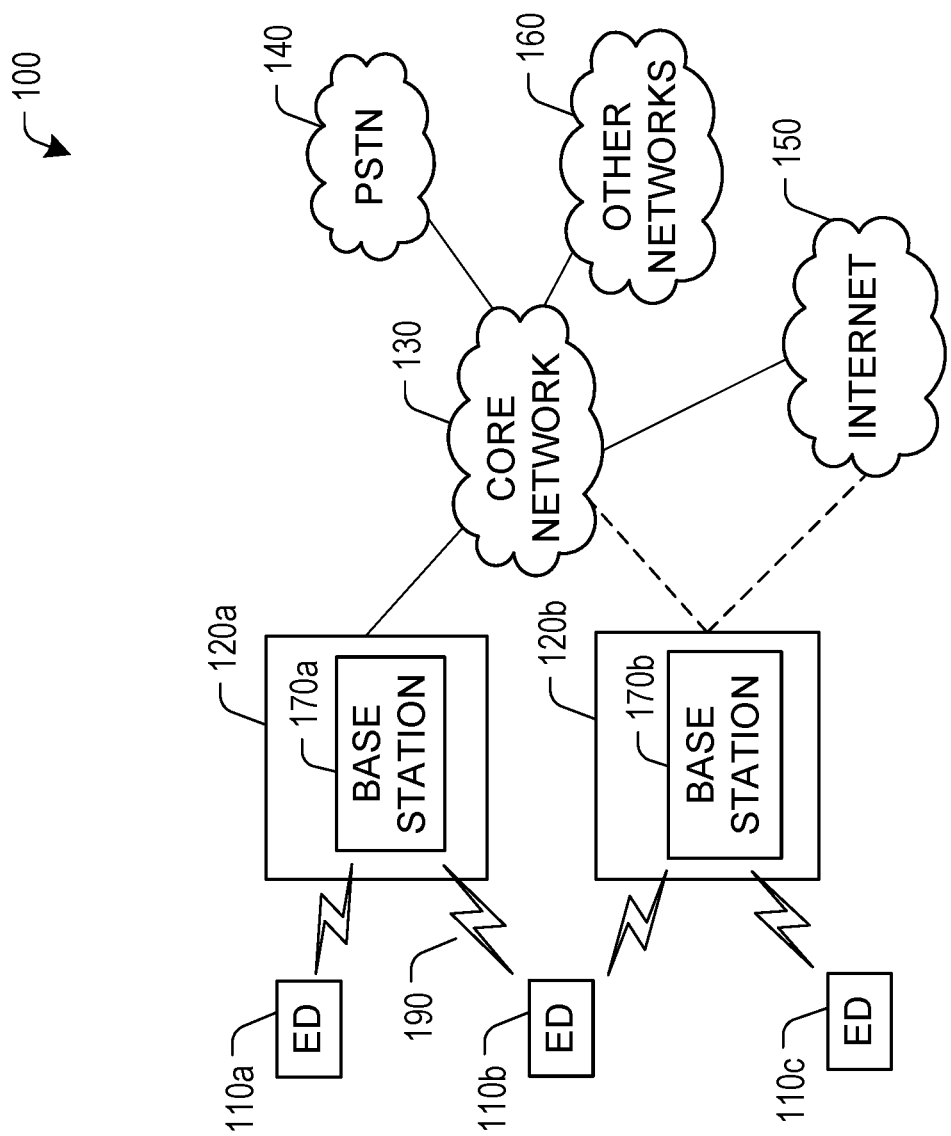
FIG. 1 is a network diagram of a communication system.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the Third Generation Partnership Project (3GPP) fifth generation (5G) New Radio (NR), different devices and services are expected to have different requirements for wireless communication. For example, some devices may require low-latency communication (e.g., less than 0.5 ms round trip) with high reliability (e.g., less than $10^{-5}$ block error rate (BLER) within 0.5 ms). These devices are proposed to communicate in a framework sometimes known as ultra-reliable low-latency communication (URLLC). URLLC traffic may be unpredictable and sporadic in nature, and may or may not require a high data rate depending on the application. URLLC may be used in either uplink (UL) or downlink (DL), and may be particularly applicable in cases such as vehicle-to-vehicle (V2V) communication for coordinating automobile traffic.

To satisfy the latency and reliability requirements of URLLC communication, a number of features are proposed that differ from conventional Long Term Evolution (LTE) communication and from NR enhanced mobile broadband (eMBB) communication.

In some examples, a first portion of network resources, for example time-frequency resources such as one or more bandwidth parts (BWPs), is reserved for URLLC traffic and a second portion of network resources is reserved for eMBB traffic. Optionally, a third portion of network resources (sometimes called a "coexistence region") is used for both eMBB and URLLC traffic. Network resources that are used for URLLC traffic may be configured to increase flexibility or reduce latency, for example by having a finer granularity or periodicity of signaling than the slot-based scheduling of eMBB, or a shorter minimum transmission duration. In addition, URLLC traffic may use a more robust modulation and coding scheme (MCS) than eMBB traffic for the same channel quality, for example a lower order QAM modulation or a lower code rate.

The duration of eMBB transmissions may be described or measured in subframes (subframe in NR is fixed as 1 ms duration), which are a subdivision of a radio frame (10 ms duration). The duration of a transmission may also be described or measured in slots. A slot is typically defined as 14 orthogonal frequency-division multiplexing (OFDM) symbols in the numerology being used, such that the duration of a slot depends on the subcarrier spacing (SCS) of the transmission. For example, 14 OFDM symbols at 15 kHz SCS corresponds to a duration of 1 ms. Other numerologies may be used, which may have SCS that differ from 15 kHz by a factor of $2^n$, where n is an integer. Numerologies with this SCS relationship are sometimes known as "scalable" numerologies. Scalable numerologies may be configured to have symbol alignment, such that the beginning and end of one symbol of a first numerology align in time with the beginning and end of $2^n$ consecutive symbols of a second numerology having a larger subcarrier spacing. Alternatively, scalable numerologies may be configured to only have subframe alignment, such that the beginning and end of one subframe align in time for multiple numerologies or for all supported numerologies. Two numerologies may differ in parameters other than SCS. For example, a first 60 kHz SCS numerology may be defined having a first cyclic prefix (CP) length, and a second 60 kHz SCS numerology may be defined having a second, extended CP (ECP) length. In this case, a slot may be defined as 12 symbols of the 60 kHz ECP numerology, which have the same duration as a 14-symbol slot of the 60 kHz normal CP (NCP) numerology. An ECP numerology may not be scalable with an NCP numerology. However, a separate, scalable set of ECP numerologies could be defined, having $12*2^n$ symbols per subframe when the SCS differ by a factor of $2^n$.

URLLC transmissions in the physical downlink shared channel (PDSCH) or the physical uplink shared channel (PUSCH) may be as short as one or two symbols. For example, downlink URLLC communications of 2, 4, or 7 symbols in duration may be supported, whereas uplink URLLC communications as short as 1 symbol in duration may be supported. URLLC traffic may use a different numerology than eMBB traffic, for example a larger SCS, to decrease the duration of the transmission and thereby decrease latency. For example, URLLC traffic may use a numerology with a 60 kHz SCS, each OFDM symbol of which will have one-fourth the duration of an OFDM symbol having a 15 kHz SCS used for eMBB traffic. The first symbol of an URLLC transmission may include a demodulation reference signal (DMRS) that is optionally used to identify the UE that is the transmitter or the intended receiver of the transmission, such as when multiple UEs are configured to use the same resources.

eMBB and URLLC traffic may also differ in other ways. For example, eMBB traffic is typically scheduled (also known as "grant-based"), meaning that the network allocates (grants) particular time-frequency resources for a particular uplink or downlink communication, and informs the UE of the resource allocation prior to the communication. Scheduled communication typically results in efficient bandwidth usage for relatively large eMBB transmissions that are frequent and predictable. However, the scheduling signaling can introduce undesirable amounts of delay and bandwidth overhead for URLLC communications that may be small in size, and sporadic and unpredictable in timing. URLLC communications may use a framework known as "configured grant", which operates without explicit time/frequency scheduling of specific resources for each communication. Instead, network resources are configured by higher-layer signaling such as radio resource control (RRC) signaling and optionally by layer 1 signaling such as downlink control information (DCI) in a physical downlink control channel (PDCCH). Some of the configured parameters are shown below in Table 1, for two different types (Type 1 and Type 2) of configured grant. Some of these configured parameters will be discussed below in greater detail. A URLLC communication can be transmitted as soon as it is ready for transmission, according to the configuration, without having to wait for a grant of resources. Because of the sporadic nature of URLLC traffic, multiple UEs may be configured to use the same resources, which may result in collisions between unscheduled transmissions from different UEs. These collisions may be resolved in any suitable way, for example by each UE transmitting a preconfigured number of repetitions of its transmission using a different frequency-hopping pattern.

TABLE 1

| Parameters | Descriptions | Values and ranges | Signaling for GF Type 1 | Signaling for GF Type 2 |
|---|---|---|---|---|
| Periodicity | Time-domain periodicity (K Transmission Occasions) | | UE-specific RRC | UE-specific RRC |
| Power Control parameters | Open-loop power control parameters | | | |
| Repetition number K | Maximum repetition number K | {1, 2, 4, 8} | | |
| RV sequence | RV sequence used for repetitions | {0231} or {0303} or {0000} | | |
| Waveform | CP-OFDM or DFT-s-OFDM | CP-OFDM or DFT-s-OFDM | | |

TABLE 1-continued

| Parameters | Descriptions | Values and ranges | Signaling for GF Type 1 | Signaling for GF Type 2 |
|---|---|---|---|---|
| HARQ process number | Maximum HARQ process number supported | Any integer between 1 and 16 | | |
| Time-domain offset | Time-domain offset to initialize GF resource (slots) | | | Not used |
| Time-domain allocation | Time-domain allocation for one TO | Same as for grant-based | | UE specific DCI |
| Frequency-domain allocation | Frequency-domain allocation | Same as for grant-based | | |
| UE-specific DMRS | DMRS configured for the UE | Same as for grant-based | | |
| MCS | One MCS value used for the transmission of a TB | Same as for grant-based | | | eMBB and URLLC traffic may coexist in a variety of ways. In a first example, both traffic types may use the same time-domain granularity. In this example, URLLC traffic can be transmitted in a next available transmission interval, and any eMBB traffic intended to be transmitted on the same resources during that interval can be postponed to a later time. This approach may be particularly suitable for downlink communication, in which the same network node is responsible for transmitting both the URLLC and eMBB traffic. In a second example, as discussed above, frequency-division multiplexing (FDM) may be used, by allocating one or more BWPs to eMBB and one or more other BWPs to URLLC. In this example, both traffic types could optionally use different numerologies, and neither would interfere with the other.

In a third example, eMBB traffic having a longer transmission interval may be opportunistically transmitted in the URLLC resources, or URLLC traffic having a shorter transmission interval may be opportunistically transmitted in the eMBB resources, to take advantage of underuse resulting from the sporadic nature of URLLC. Optionally, all or a portion of scheduled or ongoing eMBB transmissions may be dynamically pre-empted so that the pre-empted resources can instead be used to transmit URLLC traffic, without waiting for the eMBB transmissions to be completed. The URLLC traffic transmitted in the pre-empted resources may have the same numerology as the pre-empted eMBB transmissions. Alternatively, the URLLC traffic may have a different numerology, such as a scalable numerology having a larger SCS by a factor of $2^n$, with symbol alignment so that $2^n$ symbols of URLLC traffic align with each pre-empted symbol of eMBB traffic. This approach may be particularly suitable for DL communication, where the same network node may be responsible for transmitting both the URLLC and eMBB traffic. In this document, a device transmitting URLLC traffic may be referred to as a "URLLC transmitter", and a device receiving URLLC traffic may be referred to as a "URLLC receiver". Similarly, a device transmitting eMBB traffic may be referred to as an "eMBB transmitter", and a device receiving eMBB traffic may be referred to as an "eMBB receiver".

When eMBB traffic is pre-empted in favor of URLLC traffic, a pre-emption indication (PI) may be transmitted to the eMBB receiver, to indicate which of the eMBB receiver's scheduled resources are subject to pre-emption. The PI may, for example, be a dynamic pre-emption indication. The PI may be transmitted in a group common DCI in a group common PDCCH, for example using DCI format 2_1. The PI may include a bitmap to indicate which time-frequency resources have been pre-empted. The bitmap may be an M-by-N bitmap, representing M time subdivisions and N frequency subdivisions of the time-frequency region that is subject to possible pre-emption, with each bit indicating whether eMBB traffic in a corresponding subdivision of the time-frequency region has been pre-empted in favor of URLLC traffic. In one example, M is 14 and N is 1. In another example, M is 7 and N is 2. For example, if the eMBB UEs monitor the PI every slot, then the M-by-N bitmap may refer to subdivisions of a time-frequency region corresponding to one slot in duration and one BWP in bandwidth. A separate PI may be transmitted in each BWP that supports coexistence of eMBB and URLLC traffic. An eMBB receiver may periodically monitor a group common control channel for the PI, for example every slot, at times when the eMBB receiver is scheduled to receive eMBB traffic. A fully or partially pre-empted eMBB transmission may be retransmitted at a later time, for example by transmitting one or more code block groups (CBGs) that were not successfully decoded, or by transmitting a different redundancy version of one or more of the CBGs in the original eMBB transmission. Retransmitting only some CBGs instead of the entire transport block may be advantageous in cases where only a small number of CBGs fail to be decoded due to pre-emption, because less bandwidth is required for the retransmission.

An eMBB transmission that is fully or partially pre-empted can be said to be "punctured". The PI assists the eMBB receiver with decoding, because the eMBB receiver may disregard the portion of the transmission that is pre-empted, instead of attempting to decode it as part of its own intended transmission. The PI may also optionally indicate that the remaining portion of a partially pre-empted eMBB transmission has been rate-matched to account for the pre-empted resources. The eMBB receiver may attempt to decode the partially pre-empted transmission, and send HARQ feedback to the eMBB transmitter. If the eMBB receiver receives a HARQ retransmission of the original transmission, the eMBB receiver may optionally not attempt to soft-combine the pre-empted portion with the retransmission.

In order to increase the reliability of URLLC transmissions, a URLLC transmitter may be configured to transmit K repetitions of a URLLC transmission, where K is an integer greater than one. The repetition may apply to either or both of control information (e.g., physical uplink control channel (PUCCH)) or data (e.g., physical uplink shared channel (PUSCH)). The value of K may be configurable, for example by higher-layer signaling (e.g., radio resource control (RRC) signaling). The K repetitions consist of an initial transmission and K−1 retransmissions of either the initial transmission or a different redundancy version (RV) of the initial transmission. To mitigate the latency associated with retransmissions, the URLLC transmitter may transmit all K repetitions without waiting for or receiving Hybrid Automatic Repeat reQuest (HARQ) feedback from the URLLC receiver. The repetitions may be transmitted in consecutive transmission opportunities. The K repetitions are transmitted irrespectively of whether previous repetitions of the URLLC transmission were successfully received. Alternatively, the URLLC transmitter may continue to transmit repetitions until the URLLC transmitter receives a grant of scheduled uplink resources to retransmit the URLLC transmission, up to a maximum of K total repetitions. The grant may indicate the HARQ process ID of the transport block to be retransmitted. Alternatively, the URLLC transmitter may transmit repetitions until the last transmission opportunity within the current time-domain period, based on the periodicity of the configured grant resources. The K repetitions may be transmitted on the same frequency resources, e.g. the same BWP, or may use frequency hopping so that not all of the K repetitions are transmitted on the same frequency resources. The URLLC transmitter may start a HARQ process timer upon transmission of the first repetition, and assume either successful or unsuccessful receipt of the transmission if no acknowledgement is received before the timer expires. In some embodiments, one or more of the K repetitions may be transmitted in frequency resources for eMBB traffic, in which case these repetitions may preempt eMBB traffic.

In the Third Generation Partnership Project (3GPP) Release 15 (R15), 3GPP TS 38.214 V15.2.0 (2018-06)) slot-based PDSCH repetition in time is supported with the number of repetitions configured by aggregationFactorDL>1 (i.e., 2, 4, 8) via radio resource control (RRC) signaling. This approach is limited to single layer transmission. One DCI is used to specify time and frequency resources, and together with configured aggregationFactorDL>1, the repetitions use the same frequency resource and time allocation in consecutive slots.

Each repetition has an associated redundancy version. Not necessarily all of the original data is transmitted in a given redundancy version. A table defined in TS28.214 provides an association between a parameter $RV_{id}$ which is signaled dynamically in the DCI, and a RV sequence used in the transmission occasions.

TABLE 5.1.2.1-2

Applied redundancy version when aggregationFactorDL > 1

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For example, if aggregationFactorDL=4, if the $rv_{id}$ indicated is 2, then the first transmission occasion (e.g. timeslot T1) contains redundancy version 2, the second transmission occasion (e.g. timeslot T2) contains redundancy version 3, the third transmission occasion (e.g. timeslot T3) contains redundancy version 1, and the fourth transmission occasion (e.g. timeslot T4) contains redundancy version 0. So PDSCH repetition can be considered as being sent in one diversity domain, namely time.

Similarly, in R15, slot-based PUSCH repetition is supported and called "multi-slot" PUSCH transmission, with the number of repetitions configured by aggregationFactorUL>1 (i.e., 2, 4, 8) via RRC signaling. Again, this is limited to single layer transmission, and repetitions use the same time frequency resource in consecutive slots from one DCI. A table defined in TS28.214 v15.2 (2018-06) provides the association between $RV_{id}$ (signaled dynamically in DCI) and RV sequence used in the repetitions.

TABLE 6.1.2.1-2

Redundancy version when aggregationFactorUL > 1 (TS38.214)

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In addition, for PUSCH repetition, frequency hopping (FH) is supported (TS28.214 v15.2 (2018-06) section 6.3). Options include:
Mode 1: intra-slot FH, applicable to single-slot and multi-slot PUSCH transmission; and
Mode 2: inter-slot FH, applicable to multi-slot PUSCH transmission; and
Mini-slot FH.

When FH on the PUSCH is enabled and for resource allocation type 1, frequency offsets are configured by a higher layer parameter frequencyHoppingOffsetLists in PUSCH-Config as a function of the size of the active bandwidth part (BWP):

a) when the size of the active BWP is less than 50 physical resource blocks (PRBs), one of two higher layer configured offsets is indicated in the UL grant (one bit in DCI formats 0_0, 0_1); and b) when the size of the active BWP is equal to or greater than 50 PRBs, one of four higher layer configured offsets is indicated in the UL grant (two bits in DCI formats 0_0, 0_1).

In summary, PUSCH repetition can be considered as being sent in up to two diversity domains, namely time and frequency. For example, if aggregationFactorUL=4 is configured, $RV_{id}$ in DCI=0, the corresponding RV sequence=(0, 2, 3, 1) for repetitions 1, 2, 3, 4, is used. For the time diversity domain, the repetitions are in consecutive slots (with the corresponding RV sequence). For the frequency diversity domain, if FH mode is configured and activated in DCI, then the repeated PUSCHs are hopped in alternate frequencies (e.g. F1=RB_start and F2=RB_start+RB offset for R15) over the PUSCH repetitions in time. An example is shown in the following, where $n_s^\mu$ is the current slot number within a radio frame for a given subcarrier spacing (SCS) μ.

| $n^{th}$ transmission occasion of PUSCH | Associated RV based on $RV_{id}$ = 0 | Time instant (slot number $n_s^\mu$ for a given SCS u) | Frequency |
|---|---|---|---|
| 0 | 0 | T1 = $n_s^\mu$ | F1 |
| 1 | 2 | T2 = $n_s^\mu$ + 1 | F2 |
| 2 | 3 | T3 = $n_s^\mu$ + 2 | F1 |
| 3 | 1 | T4 = $n_s^\mu$ + 3 | F2 |

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved Node-B (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2A:
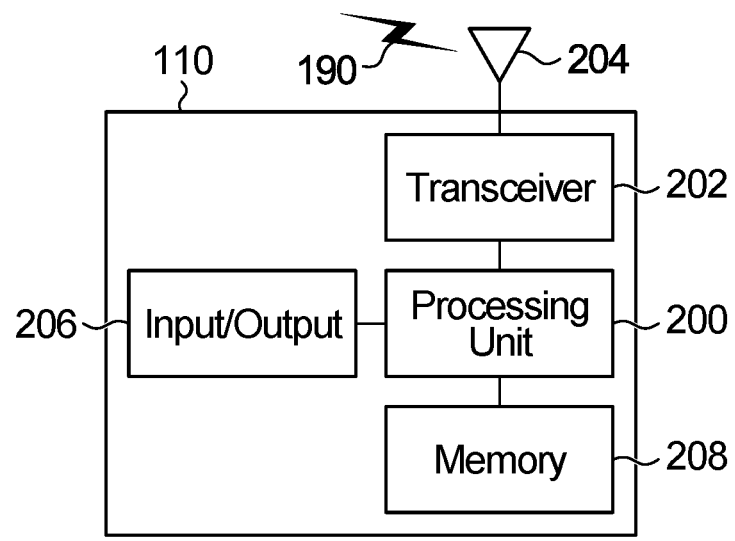
FIG. 2A is a block diagram of an example electronic device.
Figure 2B:
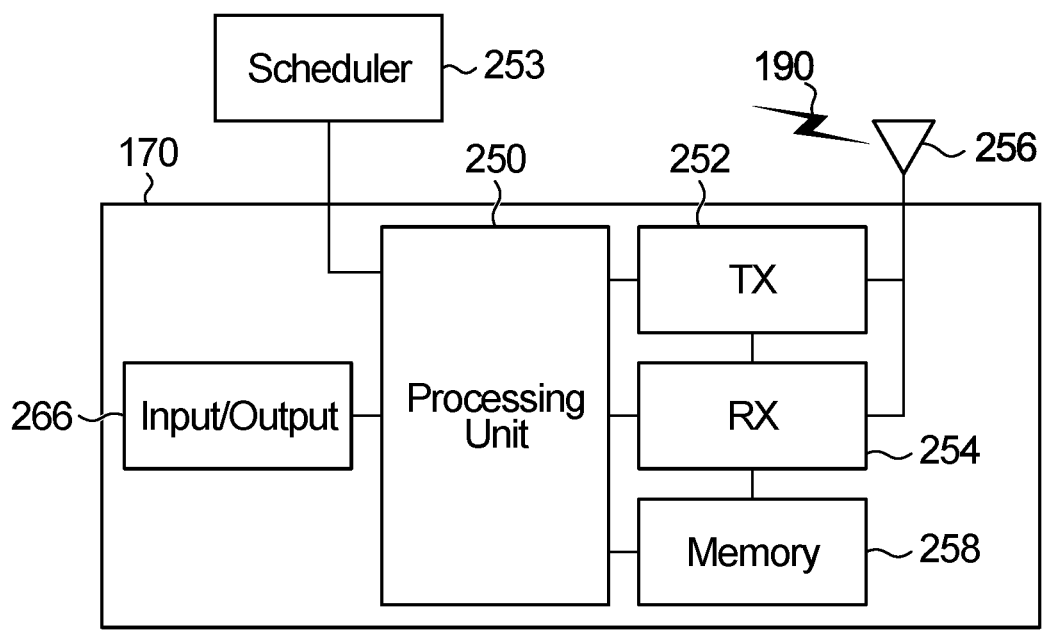
FIG. 2B is a block diagram of an example electronic device.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

PDSCH Repetition Using Multiple Diversity Domains

In accordance with an embodiment of the disclosure, PDSCH repetition can be sent using multiple diversity domains.

Optionally, the existing parameter specifying the number of repetitions (aggregationFactorDL), and/or the existing parameter specifying the mapping between $RV_{id}$ and corresponding RV sequence can be employed. Alternatively, other parameters/mechanisms can be used to convey this information.

A set of rules are defined that configure how the repetitions are to take place across the multiple diversity domains. For this embodiment, and other embodiments described herein, a set of rules may be specified in a standard, such that no signaling is required to convey them. Alternatively, one or more of the rules can be signaled. In some embodiments, there are multiple sets of rules, and signaling is used to indicate which set of rules to use. The following is a specific example of a set of rules:

Time rule: the repetitions are in consecutive slots (or mini-slots or other time units) (with the corresponding RV sequence). For example, if the number of repetitions is 4, the repetitions occur in 4 timeslots. Other rules are also possible.

Frequency rule: if FH and a set of frequencies are signaled/configured, then the repeated PDSCHs are hopped in those frequencies over the PDSCH repetitions in time. Which frequency to use is based on slot/mini-slot or some other time unit.

For example, if a set of two frequencies F1, F2 are configured, the repetitions alternate between F1 and F2. Other rules are also possible.

Spatial rule: if a set of transmission configuration indication (TCI) states (representing multiple sets of QCL information associated with multiple transmit receive points (TRPs)) are signaled/configured, then the repeated PDSCHs are sent using different TCI states over the PDSCH repetitions in time. For example, if two TCI states are given (TCI state 1, TCI state 2), the first TCI state 1 can be used in each transmission occasion n where n mod 2=0, and TCI state 2 can be used in each transmission occasion n where n mod 2=1. In another example, if there are M TCI states, then n mod M=0, 1, . . . , M−1 is used. Other rules are also possible.

Separate rules for different domains can be used, or combined rules for multiple domains can be used.

For example, if aggregationFactorDL=4, $RV_{id}$ in DCI=0 with the corresponding RV sequence=(0, 2, 3, 1) for repetition 1, 2, 3, 4, respectively. If two TCI states are given (TCI state 1, TCI state 2), the first TCI state 1 can be used in each transmission occasion n where n mod 2=0, and TCI state 2 can be used in each transmission occasion n where n mod 2=1. This is a specific example where there are two TCI states. In another example, if there are M TCI states, then n mod M=0, 1, . . . , M−1 is used. Other rules are also possible.

The table below shows a specific example in which the three rules defined above are used, where:
four repetitions are configured;
there are two frequencies F1,F2; and
there are two TCI states.

| $n^{th}$ transmission occasion of PDSCH | Associated RV based on $RV_{id}$ = 0 | Time instant (slot/mini-slot number $n_s^\mu$ for a given SCS u) | Frequency | Spatial domain |
|---|---|---|---|---|
| 0 | 0 | T1 = $n_s^\mu$ | F1 | TCI state 1 |
| 1 | 2 | T2 = $n_s^\mu$ + 1 | F2 | TCI state 2 |
| 2 | 3 | T3 = $n_s^\mu$ + 2 | F1 | TCI state 1 |
| 3 | 1 | T4 = $n_s^\mu$ + 3 | F2 | TCI state 2 |

PUSCH Repetition Using Multiple Diversity Domains

In accordance with an embodiment of the disclosure, PUSCH repetition can be sent using multiple diversity domains, beyond just time and frequency.

Optionally, the existing parameter specifying the number of repetitions (aggregationFactorUL), and/or the existing parameter specifying the mapping between $RV_{id}$ and corresponding RV sequence can be employed. Alternatively, other parameters/mechanisms can be used to convey this information.

A set of rules are defined that configure how the repetitions are to take place across the multiple diversity domains. The following is a specific example of a set of rules:
Time rule: the repetitions are in consecutive slots (or mini-slots or other time units) (with the corresponding RV sequence). For example, if the number of repetitions is 4, the repetitions occur in 4 timeslots.
Frequency rule: if FH and a set of frequencies are signaled/configured, then the repeated PDSCHs are hopped in those frequencies over the PDSCH repetitions in time. Which frequency to use is based on slot/mini-slot or some other time unit. For example, if a set of two frequencies F1,F2 are configured, the repetitions alternate between F1 and F2. For example, the two frequencies may be defined as per Release 15 to be RB_start and RB_start+frequency offset for R15).
Spatial rule: if a set of precoders/beams/TRPs are signaled/configured, then the repeated PDSCHs are sent using different precoders/beams/TRPs over the PUSCH repetitions in time, or time/freq if FH is also configured/used. For example, if (Precoder 1, Precoder 2) are given, the first Precoder 1 can be used in each transmission occasion n where n mod 2=0, and Precoder 2 can be used in each transmission occasion n where n mod 2=1. This is example of 2 precoders, if there are M precoders, then n mod M=0, 1, . . . , M−1 is used to define the precoder to use for each transmission occasion. Other associations between n transmission occasions and precoders are possible.
Separate rules for different domains can be used, or a combination of rules for multiple domains can be used.

The table below shows a specific example in which the three rules defined above are used, where:
four repetitions are configured;
there are two frequencies F1,F2; and
there are two precoders.

| $n^{th}$ transmission occasion of PUSCH | Associated RV based on $RV_{id}$ = 0 | Time instant (slot number $n_s^\mu$ for a given SCS u) | Frequency | Spatial domain |
|---|---|---|---|---|
| 0 | 0 | T1 = $n_s^\mu$ | F1 | Precoder 1 |
| 1 | 2 | T2 = $n_s^\mu$ + 1 | F2 | Precoder 2 |
| 2 | 3 | T3 = $n_s^\mu$ + 2 | F1 | Precoder 1 |
| 3 | 1 | T4 = $n_s^\mu$ + 3 | F2 | Precoder 2 |

In other embodiments, to support reliable applications such as URLLC with 99.999% success transmission rate, a UE is to ensure K repetitions (or retransmissions) upon its configuration for grant-free transmissions of a transport block (TB), which can be determined by eNB or UE based on, e.g., UE channel conditions, mobility, and others such as transmission parameters (MCS, SCS, etc). In such cases, given the number of K transmission occasions (TOs) configured for the potential K repetitions within one or more slots in each resource periodicity period, an actual number of available transmission opportunities for the TB can be less than K due to the fact that a packet of the UE can arrive at any time (e.g., any symbol within a slot) in the periodicity period, for example, for K=4 (TOs) configured, the packet can arrive at the middle of the second TO, so the initial transmission can be performed from the third TO, thus only 2 transmissions can be done for the TB in this resource periodicity period, which may not be enough to ensure the TB transmission reliability. To guarantee the K-repetition transmissions for the TB, there are several options to increase the actual repetition number of the TB in satisfying this requirement, as described in the following paragraphs.

Option 1: Each resource periodicity period (each associated with a different pre-defined or preconfigured HARQ ID) defines or configures K TOs for K repetitions. If the initial transmission of a UE TB is not from the first TO in one resource period (due to the traffic arrival time uncertainty), the TB transmissions can continue at the TOs defined/configured in the next resource period; that is the cross-period repetitions can be done at the configured TOs in more than one resource period to guarantee a total of K repetitions. A method is needed to determine or identify the first transmission of the TB for the UE. In one embodiment, the gNB counts up to the K repetitions that belong to the same UE TB for, e.g., RV indication with HARQ signal soft-combining or HARQ signal soft-combining with pre-defined or fixed RV (e.g., {0000}). One way to identify the initial transmission of a TB is to configure the UE for one resource configuration with at least two DMRS, one for initial transmission and the other for the other repetitions (or retransmissions) of the UE TB. As a result, in this case, the K repetitions within more than one resource period can have more than one (derived) HARQ ID whose signals are required to do soft-combining. For ACK/NACK feedback to the UE TB transmission, one HARQ ID (e.g., the first HARQ ID with the initial transmission) and/or one UE DMRS (e.g., the DMRS with the initial transmission) can be used.

Option 2: Given the number K of TOs configured in one resource period and if the period is large enough such that more resources of the same size as the TO can be found, these resources within the same resource period can be additional TOs to be used as needed if the actual number of transmissions/repetitions for a TB is less than K. In this option, the first/initial transmission of the TB and the UE have to be detected and identified also in order to figure out how many additional resources (TOs) are required by the gNB where these transmissions (with single HARQ ID based on this period) can be soft-combined. Note that in this case, no transmissions will cross the resource period.

Option 3: In Option 2, the multiple transmissions/repetitions are allowed to cross the resource period, such that K the repetitions can be achieved. The transmission resources in the other period(s) can be configured TOs and/or the other resources of the same TO size.

Option 4: If a UE TB does not have enough transmission repetitions in one resource period due to the randomness of the traffic arrival time, the UE simply starts to transmit its TB from the first TO of the next resource period.

Option 5: If a UE TB is transmitted in only a subset of the TOs in one resource period (that is, not enough number of transmission repetitions in this resource period), the UE TB will continue to be transmitted in all TOs of the next resource period.

In some embodiments, for above option schemes, the option configuration and/or parameter configuration in one option scheme can be done by at least one of higher layer signaling and L1 signaling (e.g., DCI) in a way of broadcast, multiple-cast and/or unicast message(s).

Multiple Repetitions Per Time Instant.

In the above-described embodiments, there is a maximum of one repetition per time instant (Time domain). The association between PDSCH/PUSCH with other diversity domains (e.g. Frequency or Spatial domains) can be referred to by the time domain information that associated with the PDSCH/PUSCH repetition in time.

In another embodiment, there can be more than one repetition per time instant (e.g. associated with multiple TRPs at the same time). In this case, signaling can be employed to indicate:
a set of TCI states (for downlink transmission DL) or a set of precoders (for uplink UL transmission);
an indication of whether multiple TCI states are to be used at the same time instant or at different time instants, which can be signaled by dynamic signaling or configured by higher layer signaling (e.g. RRC or RRC+MAC CE) or specified in standard, or any combination of the aforementioned signaling Rules are provided to associate between PDSCH/PUSCH repetition and this information.

A specific example is provided in the table below, where it can be seen that the first two transmission occasions 0,1 are associated with a first time instant T1, and the next two transmission occasions 2,3 are associated with a second time instant T2.

This approach can be extended to include frequency diversity, for example in which case multiple configured frequencies are alternated between for the transmission occasions. For this embodiment, and other embodiments that include frequency as one of the diversity domains, other associations between the configured frequencies and the transmission occasions are possible. Similarly, for the embodiments described herein, where specific associations between configured values for other diversity domains (e.g. time, space) are described by way of example, other associations between configured values and the transmission occasions are possible.

| $n^{th}$ transmission occasion of PDSCH | Associated RV based on $RV_{id} =$ 0 | Time instant (slot/mini-slot number $n_s^\mu$ for a given SCS u) | Spatial domain |
|---|---|---|---|
| 0 | 0 | $T1 = n_s^\mu$ | TCI state 1, |
| 1 | 2 | $T1 = n_s^\mu$ | TCI state 2 |
| 2 | 3 | $T2 = n_s^\mu + 1$ | TCI state 1, |
| 3 | 1 | $T2 = n_s^\mu + 1$ | TCI state 2 |

Figure 3:
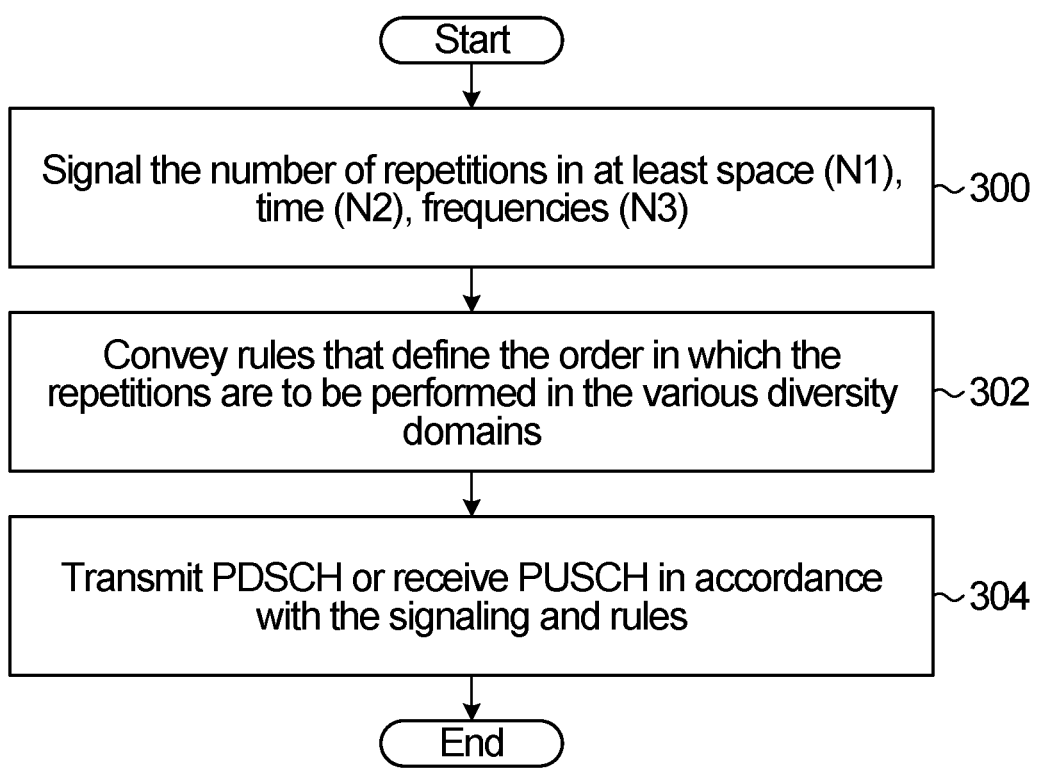
FIG. 3 is a flowchart of a method of transmitting PDSCH or PUSCH repetitions.

Embodiment: Signaling Association Between PDSCH/PUSCH Repetition Using Multiple Diversity Domains A method of signaling association between PDSCH/PUSCH repetitions using multiple diversity domains is provided. The method is performed by a base station. The method will be described with reference to the flowchart of FIG. 3. The method begins in block 300 with signaling the number of repetitions in at least space (N1), time (N2), frequencies (N3), with the total number of repetitions=N1*N2*N3. This can be achieved through one or a combination of:
Dynamic signaling (e.g. DCI)
High layer signaling (e.g., radio resource control (RRC) signaling)
High layer signaling+dynamic signaling. For example, a definition of a set of different configurations can be conveyed by RRC signaling or RRC signaling with MAC CE signaling (high layer signaling), and a specific one of these configurations is selected by DCI (dynamic signaling)
Standard Specification
Or implicit signaling via the number of multiple values for a given diversity, e.g. if two TCI states are explicitly signaled/configured then N1=2 is implied or if two frequency information are explicitly signaled/configured then N2=2 is implied The method continues in block 302 with conveying rules that define the order in which the repetitions are to be performed in the various diversity domains. This can be achieved through one or a combination of:
High layer signaling (e.g., radio resource control (RRC) signaling)
Preconfiguration, e.g. specified in a standard specification
Examples of possible rules include:
a. spatial domain first, time next;
b. time first, spatial domain next;
c. frequency first, time next;
d. If multi-TRP is not enabled, then frequency first, time next or time first and frequency next;
e. some other order.

In some embodiments, blocks 300 and 302 can be performed separately and used in combination to specify the association between the repetition and multiple diversity domains. Alternatively, the blocks can be performed together to specify the association. Although the examples have focused on time, frequency and spatial domains, other domains can be used instead, or in addition. For example, a code domain can be employed.

Following block 302, block 304 takes place in which PDSCH is transmitted or PUSCH is received in accordance with the signaling and rules. From the UE perspective the method is similar, but the UE will receive the signaling and the rules, and the UE will either receive PDSCH or transmit PUSCH.

In another embodiment, multi-dimension patterns are used to define an arbitrary mapping of transmission occasions to multiple diversity domains (which can include a subset or all of the configured diversity domains. This gives flexibility where the total number of repetitions is to be N1*N2 (where N1 and N2 are the numbers of possibilities for two diversity domains), or where the number of repetitions is to be less than N1*N2*N3 (for three domains) etc. The multi-dimension pattern for two or more domains can be combined with fixed rules for one or more other domains.

For example, where the number of repetitions=2, and where N1=2 and N2=2, a multi-dimensional pattern can be used to indicate that the $1^{st}$ and $2^{nd}$ PDSCH/PUSCH repetitions are to be transmitted from/to TRP1 at time 1, and TRP2 at time 2, respectively. The table below shows various examples, where the number of repetitions=N in {2, 4, 8} but other values for N are possible, with corresponding nth transmission or transmission occasion, where n=0, . . . , N−1.

is transmitted or received according to spatial domain information $s_2$. In some embodiments, the RV values used can be configured/signaled/specified separately for each spatial domain information, e.g. an rv_id in DCI can specify at least one RV sequence, associated with at least one spatial domain information, e.g. one rv_id can indicate RV sequences (0231) and (3102) associated with spatial domain information $s_1$ and $s_2$, respectively. If one rv_id is associated with more than one RV sequence, this can be indicated by dynamic signaling (DCI), higher layer signaling or standard specification, or any combination. The association between rv_id and RV sequences can be indicated by dynamic signaling (DCI), higher layer signaling or standard specification, or any combination. Note the rv values 0 and 3 are self-decodable and are configured to be transmitted or received from two TRPs at the earliest time. The separate configuration for relevant information for repetition per spatial domain information can be beneficial in case of

| Mode Notation | Rule |
| --- | --- |
| TT | Repetition in time, where the nth transmission or transmission occasion, n = 0, 1, . . . N − 1 is associated with time instants, t0 < t1 < . . . < t_N − 1, where the length between two consecutive time instants can be a fixed time unit, e.g. slot, mini-slot, or other time unit, or be variable. Other domains, e.g. frequency, spatial, code domains, are the same for all the repetitions. |
| TTFF | Repetition in time (similar to above description), and frequency hopping is over repetitions with a given relationship. For example, for the for nth transmission, n mod $L_F$ = 0, 1, . . . , $L_F$ − 1 can be used as input to a one-to-one mapping with frequencies $f_i$, i = 0, 1, . . . , $L_F$ − 1 in an array F where $L_F$ is the length of the array of frequencies. |
| TTSS | Repetition in time (similar to above description), and spatial hopping is over the repetitions with a given relationship. For example, for the nth transmission, n mod $L_S$ = 0, 1, . . . $L_S$ − 1 can be input to a one-to-one mapping with spatial relevant information $s_i$, i = 0, 1, . . . , $L_S$ − 1 in an array of S where $L_S$ is the length of the array of spatial relevant information. For example, all n such that n mod $L_S$ = i is associated with $s_i$. Other mapping patterns are also possible. Spatial relevant information can be any information or set of information that depends on, or varies with, spatial domain information, e.g. TCI state and/or precoder and/or antenna port and/or TPC (transmit power control) and/or MCS and/or sounding reference signal resource indicator. |
| SS | Repetition in space, where the nth transmission, n = 0, 1 , . . . N − 1 is associated with spatial relevant information, $s_0, s_1, \ldots, s_L\_S − 1$ in an array S, where there can be one-to-one mapping between all n in n mod $L_S$ = 0, 1, . . . $L_S$ − 1 with $s_0, s_1, \ldots, s_{Ls-1}$ in S. If N = $L_S$, then each nth transmission is associated with one spatial relevant information. If N < $L_S$, then a subset of S can be used for the nth transmission, n = 0, 1, . . . N − 1. If N > $L_S$, and e.g. each nth transmission has rank = 1, then multiple nth transmissions are transmitted based on the spatial relevant information using ranks up to ceil(N/$L_S$) |

In some embodiments, the configured parameters aggregationFactorDL or aggregationFactorUL or the number of repetitions N mentioned earlier can be used to specify the number of repetitions in time domain only. In some embodiments, the parameters, e.g. aggregationFactorDL or aggregationFactorUL or the number of repetitions N can be used to specify the number of repetitions in at least one diversity domain. In some embodiments, the number of repetitions in spatial domain can be configured/signaled/specified separately for each spatial domain information, e.g. N_$s_1$ and N_$s_2$ are the number of repetitions associated with spatial domain information $s_1$ and $s_2$, respectively. In some embodiments, the nth transmission with n=0, 1, . . . N_$s_1$−1 is transmitted or received according to spatial domain information $s_1$ and the nth transmission with n=0, 1, . . . N_$s_2$−1 non-ideal backhaul between multiple TRPs/antenna panels. The signaling can be dynamic (DCI), higher layer signaling or standard specification, or any combination.

In some embodiments, a set of repetition indexes (i.e. the n in nth transmission) is configured/signaled/specified separately for each spatial domain information (e.g. TCI state, precoder), e.g. for N=8, n=0, 2, 5, 7 are associated with TCI state 1 or precoder 1, and n=1, 3, 4, 6 are associated with TCI state 2 or precoder 2. In some embodiments, the repetition indexes per spatial domain information can be transmitted in consecutive time instants, e.g. from the above example, the nth transmission with n=0, 2, 5, 7 are transmitted or received in time instants t_i, t_i+1, t_i+2, t_i+3, respectively, all associated with TRP state 1 or precoder1. Similarly, the nth transmission with n=1, 3, 4, 6 are transmitted or received in time instants t_i, t_i+1, t_i+2, t_i+3, respectively, all associated with TRP state 2 or precoder 2. In some embodiments, the nth transmission with n=0, 2, 5, 7 are transmitted or received in time instants t_i, t_i+2, t_i+5, t_i+7, respectively, all associated with TRP state 1 or Precoder1. Similarly, the nth transmission with n=1, 3, 4, 6 are transmitted or received in time instants t_i+1, t_i+3, t_i+4, t_i+6, respectively, all associated with TRP state 2 or precoder 2. In some embodiments, the association between the nth transmission and RV values can follow that in R15. In some embodiments, other associations between the nth transmission and RV values are possible. The signaling can be dynamic (DCI), higher layer signaling or standard specification, or any combination.

The transmissions can associate with downlink (DL)/uplink (UL) control channels (e.g. PDCCH/PUCCH), DL/UL data channels (e.g. PDSCH/PUSCH), DL or UL reference signals (e.g. CSI-RS, DMRS, PTRS, TRS, SRS . . . )

More examples with the number of repetitions=N in {2, 4, 8} are provide in the table below, again noting that other values are possible.

The transmissions can associate with DL/UL control channels (e.g. PDCCH/PUCCH), DL/UL data channels (e.g. PDSCH/PUSCH), DL or UL reference signals (e.g. CSI-RS, DMRS, PTRS, TRS, SRS, . . . ).

In some embodiments, the multiple values of each domain are signaled/configured to the UE, for example by DCI, RRC, RRC and MAC CE, specified in standard, or a combination of two or more of these avenues. The following is a specific example of such configuration in the time, frequency and spatial dimensions for a specific example, where N1=2, N2=2, and N3=2:

a) Time domain:
directly configure/signal/specify t1, t2; or
configure/signal/specify slot-based, or mini-slot based; then because an initial time/frequency resource is signaled by DCI and it gives t1 information, this can be used to determine t2; for example if slot-based is configured then t2=t1+slot_duration b) Frequency domain:
signal/configure/specify f1, f2, or RB_start and RB_offset such that the f1 is associated with RB_start and f2 is associated with RB_start+RB_offset

| Mode Notation | Description |
| --- | --- |
| SSTT | Repetition in space and time, where the nth transmission, n = 0, 1, . . . N − 1 is associated with spatial relevant information first, and then time instants, e.g. if there is an array of spatial relevant info S with length of $L_S$, then: The first $L_S$ transmissions are transmitted simultaneously at time $t_0$, and the next $L_S$ transmissions are transmitted simultaneously at time $t_1$, where $t_0 < t_1$ and so on, until the Nth transmission is reached. Each set of $L_S$ transmissions is associated with spatial relevant information array S, e.g. in increasing order. |
| FF | Similar to SS, but the data repetition transmissions are associated with an array of frequencies instead of spatial relevant information |
| FFTT | Similar to SSTT, but the data repetition transmissions are associated with arrays of frequencies and time instead of those of spatial relevant information and time |
| FFSS | Similar to SSTT, but the data repetition transmissions are associated with arrays of frequencies and spatial relevant information instead of those of spatial relevant information and time |
| TTFFSS | Repetition in time (similar to above description) first. Frequency hopping is over repetitions with a given relationship. For example, for the nth transmission, n mod L_F = 0, 1, . . . $L_F$ − 1 can be input to a one-to-one mapping with frequencies $f_i$, i = 0, 1, . . . , $L_F$ − 1 in an array F where LF is the length of the array of frequencies. Spatial hopping is over repetitions with a given relationship. For example, for the nth transmission, n mod $L_S$ = 0, 1, . . . $L_S$ − 1 can be input to a one-to-one mapping with spatial relevant information $s_i$, i = 0, 1, . . . , $L_S$ − 1 in an array S where Ls is the length of the array of spatial relevant information. |
| SSTTFF | Repetition in space and time, where the nth transmission, n = 0, 1, . . . N − 1 is associated with spatial relevant information first, and then time instants, e.g. if there is an array of spatial relevant info S with length of $L_S$, then: The first $L_S$ transmissions are transmitted simultaneously at time to, and the next $L_S$ transmissions are transmitted simultaneously at time $t_1$, where $t_0 < t_1$ and so on, until the Nth transmission is reached say at $t_x$. Each set of $L_S$ transmissions is associated with spatial relevant information array S, e.g. in increasing order. Then, frequency hopping is over repetitions with a given relationship in time. For example, all the nth transmission at time $t_i$, i mod $L_F$ = 0, 1, . . . $L_F$ − 1, i = 0, . . . , x can be used as input to a one-to-one mapping with frequencies $f_i$, i = 0, 1, . . . $L_F$ − 1 in an array F where $L_F$ is the length of the array of frequencies. |
| FFSSTT | A first set of repetitions are transmitted in different frequencies using different spatial relevant information at the same time instant, e.g. nth transmission for n = 0,1 is transmitted over $f_0$, $s_0$ and $f_1$, $s_1$, respectively at time instant $t_0$, then the next set of repetitions over different frequencies and different spatial relevant information are transmitted at the next time instant and so on, until the Nth transmission is reached. | c) Spatial domain:
signal/configure/specify spatial relevant information such as:
TCI state1, TCI state2 (DL) or
Precoder 1, Precoder 2 (UL)

The modes defined in the above tables can be used to configure/specify the rule (UE and NW behaviors) for data repetition. Of course, not all of the possibilities need be implemented, and different behaviors can alternatively be defined.

In some embodiments, a fallback mode can be configured where a given mode has been specified, but insufficient values for a given domain are specified. For example, if the number of repetitions is configured to be N>1, but multiple values for the domain (for example, multiple TCI states) are not configured or are fewer than expected for the configured mode, then a fallback mode can be executed. For example, if mode TTSS is configured, but only one TCI state is given then the fallback mode could be TT.

In another example, if N is less than what is expected for the mode, for example where N=2, mode=SSTT with 2 TCI states/precoders, then the fallback mode could be that the two repetitions are transmitted from two TRPs/beams (associated with the TCI states) in one time instant, and there is no repetition in time. In this case, the fallback mode is mode=SS. Or in another example, if mode=SS is configured/signaled with 2 TCI states, and the number of repetitions is configured to 4, then UE can understand that the two repetitions are transmitted from two TRPs/beams in one time instant, and if the number of repetitions has not reached the configured value, the next repetitions are transmitted from TRPs/beams in another time instant, e.g. next slot, mini-slot, hence this can be considered as the mode=SSTT.

In some embodiments, the modes or a subset of modes can be signaled using dynamic signaling or higher layer signaling. Dynamic signaling can be used, for example, by adding a field in DCI to indicate a mode for UL and/or DL grant, for example, a repetition mode field. Alternatively, the up to 1-bit frequency hopping flag field currently in DCI format 0_1 can be expanded to ceil(log 2(number of modes)) bits.

A table such as in the example below (more generally, any similar mapping between bits and indicated modes can be used) can be specified in a standard or configured using RRC signaling.

| repetition mode field or FH flag field value | Mode |
|---|---|
| 00 | TT |
| 01 | TTFF |
| 10 | TTSS |
| 11 | SSTT |

Where higher layer signaling is used, for example RRC or RRC plus MAC CE, one of the modes is configured using such signaling. For example, include a PDSCH-Config field in RRC, containing pdsch-repetitionmode ENUMERATED {TT, TIFF, TTSS, SSTT, SS}. In some examples, a PDSCH-Config field in RRC, containing pdsch-repetitionmode ENUMERATED {TIFF, TTSS, SSTT, SS} or pdsch-repetitionmode ENUMERATED {TTSS, SSTT} based on the RRC parameter configuration convention, where only the non-default value is specified as the choice in the ENUMERATED parameter. In some examples, the mode TT may not be the default value. Similarly, a PUSCH-Config field can be included in RRC containing pusch-repetitionmode ENUMERATED {TT, TIFF, TTSS, SSTT, SS} or pusch-repetitionmode ENUMERATED {TIFF, TTSS, SSTT, SS} or pusch-repetitionmode ENUMERATED {TTSS, SSTT}.

In some embodiments, a flag in a DCI is used to activate the configured mode. For example, a 1-bit flag can be added to the DL DCI, or the FH flag of an UL DCI can be reused. A set of configurations of multiple modes can be configured in RRC, and DCI bit(s) used to select a particular mode in the selected configuration. In some embodiments, a set of configurations of multiple modes can be specified in a standard, and DCI bit(s) used to select a particular mode in the set of configurations.

In some embodiments, the modes are configured in a standard based on the number of time units, number of frequencies and number of spatial information (more generally the number of possibilities in a given diversity domain). For example, if N>1 and multiple spatial information is configured, then a standard can specify that TTSS mode is to be used. Alternatively, SSTT could be specified to be used.

In some embodiments, at least one mode is set as default mode, e.g. TT and/or TIFF and/or TTFFSS if multiple values of those diversity domains are signaled/configured and the signaling/configuration/specification methods discussed above can be applied to other modes which are not the default modes, e.g. TTSS, SSTT. In some embodiments, the signaled/configured mode can take priority over the default mode. In some embodiments, a dynamic signaling for a mode can take priority over a higher-layer signaling of another mode, which in turn has priority over predefined specification or default mode. Other orders of priority are also possible.

As noted above, in some embodiments, there is a mapping between the nth transmission and diversity domain and RV sequence.

The rule in each mode presented above provides an example of an association between nth repetition transmission and diversity domains. However, this is just a specific example. Other different associations can be used. In another example of a different association for SSTT mode, with N=4 and 2 TCI states/precoders, not all repetitions n, where n mod 2=0 use the same TCI state 1/Precoder 1. The table below shows an example of this, where for n=0,3, TCI state 1 is used, and for n=1,2, TCI state 2 is used. Also, the table shows an example of this, where for n=0,1, TCI state 1 is used, and for n=2,3, TCI state 2 is used.

| $n^{th}$ transmission occasion of PUSCH | Time instant (slot/mini-slot number $n_s^u$ for a given SCS u) | Spatial domain (based on the association in above table) | Spatial domain (other association) | Spatial domain (other association) |
|---|---|---|---|---|
| 0 | T1 = $n_s^u$ | TCI state 1 | TCI state 1 | TCI state 1 |
| 1 | T1 = $n_s^u$ + 1 | TCI state 2 | TCI state 2 | TCI state 1 |
| 2 | T2 = $n_s^u$ + 2 | TCI state 1 | TCI state 2 | TCI state 2 |
| 3 | T2 = $n_s^u$ + 3 | TCI state 2 | TCI state 1 | TCI state 2 |

In some embodiments, the association between the nth repetition and RV value as defined in R15 can be used for PDSCH/PUSCH after the mapping between diversity domain to the nth transmission. This is shown in the table below.

Redundancy Version when aggregationFactorUL>1 or aggregationFactorDL>1

| $rv_{id}$ indicated by the DCI scheduling the PDSCH/PUSCH | $rv_{id}$ to be applied to $n^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Additional $rv_{id}$ beyond those currently specified can be defined, (for example $rv_{id}=4$ in the table below) along with corresponding RV sequences.

Alternatively, or additionally, the RV sequence for an existing $rv_{id}$ can be modified. For example, for $rv_{id}=0$ (new) in the below table, where the RVs 0, 3 which are self-decodable (i.e. can individually decode without soft combining) are put in the earlier nth transmission. For example, for $rv_{id}=1$ (new) in the below table, where RV=0 is used for all repetitions, this means that no matter which repetitions of the PDSCH is received, the UE will use RV=0.

Alternatively, or additionally, a new RV sequence can also be added with new $rv_{id}$.

Redundancy Version when aggregationFactorUL>1 or aggregationFactorDL>1

| $rv_{id}$ indicated by the DCI scheduling the PDSCH/PUSCH | $rv_{id}$ to be applied to $n^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 (old) | 1 | 0 | 2 | 3 |
| 4 (added sequence) | 0 | 0 | 0 | 0 |
| 0 (new) | 0 | 3 | 2 | 1 |
| 1 (new) | 0 | 0 | 0 | 0 |

In another example, A1 represents the association between the nth transmission and diversity domain, and A2 represents the association between the nth transmission and $rv_{id}$/RV sequences. A1 and A2 can be individually specified. The link between which rv for which domain is to be used is established via the link with nth transmission. Alternatively, the association between rv and domains can be configured/specified directly.

In some embodiments, if the FH mode is not configured in RRC (as currently used in R15 for PUSCH) and SS or SSTT or TTSS mode is configured and/or multiple values of spatial relevant information are configured/signaled, then the FH flag=1 in DCI can be interpreted by UE as the activation of the configured mode with at least spatial domain. In some embodiments, if the FH mode is not configured in RRC and multiple values of spatial relevant information are configured/signaled implying using a mode with at least a spatial domain (e.g. SSTT or TTSS or SS, one of which may be specified as a default mode for spatial domain), then the FH flag=1 in DCI can be interpreted by UE as the activation of the default mode for spatial domain diversity.

In some embodiments, similar frequency hopping (FH) information as in PUSCH transmission can be introduced to be signaled/configured for PDSCH transmission. Similar to previously described embodiments, FH flag in DCI can be introduced in a DL grant and FH flag=1 can be used to activate either of:

Option 1: a mode containing at least frequency domain diversity if aggregationFactorDL=1 or aggregationFactorDL>1, and FH mode and a set of frequency offsets are configured in RRC, or Option 2: a mode containing at least spatial domain diversity if FH mode and/or a set of frequency offsets are not configured in RRC, and SS or SSTT or TTSS mode is configured/signaled and/or multiple values of spatial relevant info is configured/signaled.

FH flag=0 means a mode with frequency or spatial diversity domain is not activated, and a default mode, e.g. TT, is used for PDSCH repetition.

In some embodiments, information such as FH information can be signaled/configured for PDSCH repetition transmission in the same manner as for PUSCH repetition transmission. When using a mode containing at least spatial domain diversity, the spatial hopping information can include at least one of the possible spatial hopping modes (e.g. SS, TTSS, SSTT) which can be configured by higher layer signaling. In some embodiments, one of these modes, e.g. TTSS, can be a default mode for when spatial domain diversity is selected or indicated, and other spatial diversity modes such as SSTT may be enabled by higher layer signaling. The spatial hopping information can include TCI state/precoder/SRS resource indicator (SRI) configurations for multiple spatial information which can be configured by RRC and selected by DCI. A UE can be signaled/configured, for example by RRC signaling, to interpret that the RRC signaling identifies a plurality of groups of TCI states, instead of a plurality of individual TCI states. In this case, the DCI will indicate one of the groups of TCI states. Similarly, for uplink, a UE can be signaled/configured, for example by RRC signaling, to interpret that the RRC signaling identifies a plurality of groups of precoders, instead of a plurality of individual precoders. In this case, the DCI will indicate one of the groups of precoders. In both cases, the group of TCI states or the group of precoders indicated by the DCI corresponds to the plurality of spatial information states to be used by the UE for spatial diversity. A spatial hopping flag can be introduced in DCI that can be used to activate the spatial hopping using the configured/signaled mode containing at least spatial domain diversity. In some embodiments, the spatial hopping flag can be omitted, in which case a mode containing spatial domain diversity may be activated by default. In some embodiments, the spatial hopping information can be signaled/configured/specified using different signaling from those mentioned above, using any combination of dynamic (DCI), higher layer signaling (RRC, RRC+MAC CE), standard specification.

In some embodiments, if aggregationFactorDL>1 or aggregationFactorUL>1, and FH information and spatial hopping information are configured/signaled/activated, then the mode used can be combined. For example, if TTFF and TTSS are individually configured or implied by default based on the availability of FH and spatial hopping information, and they are not in conflict, then the UE may interpret this configuration as a combined mode, e.g. TTFFSS. If the modes individually configured/implied are in conflict, e.g. TIFF and SSTT (because one mode maps the repetitions on time first, and the other maps the repetitions on spatial first), then SSTT can take priority over TTFF, or TIFF can take priority over SSTT, or a predetermined combined mode, e.g. TTFFSS, is applied.

In data repetition, early termination can be used to save system resources. As soon as the network or UE has correctly decoded the data in UL or DL, respectively, it should feedback timely an explicit ACK to the transmitter to stop the on-going repeated transmissions. This can improve the link efficiency of repetition, and reduce the overall network interference and the possibility of traffic blocking, because other URLLC traffic would not have to wait until the scheduled on-going repetitions are completed.

In some embodiments, for PUSCH repetition transmission, a UE-specific DCI for UL grant with the same HARQ ID and the new data indicator (NDI) toggled from the one that triggers the PUSCH repetition, can be used to indicate PUSCH-ACK before the configured number of repetitions is reached. After receiving an ACK, the UE stops transmitting the TB, and does not transmit the remaining repetitions.

In some embodiments, for PDSCH repetition transmission with aggregationFactorDL>1, the UE can behave according to one of the following options:

Option 1: after each PDSCH repetition reception slot/mini-slot/symbol/other time unit n where the number of repetitions has not reached the configured value, i.e. aggregationFactorDL, if the PDSCH is successfully decoded with or without soft combining with previous PDSCH repetitions, then the HARQ-ACK can be transmitted in time unit n+k, where k is the number of slots/mini-slots/symbols/other time units which is configured/specified/signaled by PDSCH-to-HARQ_feedback timing indicator in DCI. In some embodiments, the value of k can be configured/signaled/specified with a different value or a different time unit from that indicated in DCI, e.g. if PDSCH-to-HARQ_feedback timing indicator in DCI=k=2 slot, k=1 slot or k=7 symbols can be used for earlier termination purposes, as long as the time between PDSCH reception and the feedback is at least as long as the processing time for UE to decode the data and prepare the feedback message Option 2: after all PDSCH repetitions have been received in slot/mini-slot/other time unit n, if the PDSCH is or is not successfully decoded with or without soft combining with previous PDSCH repetitions, then the HARQ-ACK or HARQ-NACK can be transmitted in time unit n+k, where k is a number of slots/mini-slots/other time units configured/specified/signaled by PDSCH-to-HARQ_feedback timing indicator in DCI.

The UE can be configured/signaled/specified which options to use via dynamic (DCI), higher layer signaling, standard specification, or any combination of the aforementioned signaling.

DCI Repetition Index and the Association of DCI and PDSCH/PUSCH

In R1-1809317, it is proposed to include the same DCI parameter, repetition number, as in LTE URLLC for NR DL automatic repetition. It is also proposed to include a DCI parameter, repetition index, if DCI repetition is supported. This can allow a UE to determine the repetition number of a given PDSCH transmission and can help to recover a repeated PDSCH sent earlier.

Another embodiment of the disclosure provides methods for associating multiple PDCCHs and multiple PDSCHs/PUSCHs in cases where there are repetitions in both PDCCHs and PDSCHs/PUSCHs.

In a first method, each PDCCH repetition carries the same information in DCI, but is CRC scrambled by a different identifier that is tied to the repetition number. In some embodiments, the identifier can be different RNTIs, or a function of RNTI and the repetition numbers. In a specific example, the DCI carried by the ith PDCCH repetition out of N repetitions is CRC scrambled by an identifier=g(RNTI, f(i)), where i=0, 1, . . . N−1, f(i) is a one-to-one mapping function of i, and g(RNTI, f(i)) is a function of radio network temporary identifier (RNTI) and f(i). Each i corresponds to a respective DCI repetition index. In some embodiments, f(i)=i*offset, where a value of the offset may be configured by higher layer signaling or specified in standard, or by dynamic signaling. In some embodiments, f(i)=offset_i, where the values of offsets in a set may be configured by higher layer signaling or specified in a standard, or by dynamic signaling. In some embodiments, g(RNTI, f(i)) is a linear function with respect to RNTI and f(i) in a Galois Field such as RNTI+BITSTRING(f(i)), where addition is bit wise XOR in GF(2), and BITSTRING(*) is a function that maps an integer to a string of bits. In this case, the DCIs corresponding PDCCH repetitions can be soft combined due to linearity of CRC scrambling associated with PDCCH repetitions and linearity of the FEC in the Galois Field. Upon receipt, the UE performs the CRC check using each of the possible identifiers. The value of i associated with the successful CRC check is used to identify the repetition number. This can be used to help with recovery of PDSCH repetitions sent earlier in association with a missed PDCCH/DCI. More specifically, a PDSCH sent earlier (with missed PDCCH/DCI) can be combined with a current PDSCH and the rest of the repetitions if any.

In some embodiments, a UE must be aware of a configured UE-specific demodulation reference sequence (DMRS) scrambling ID for PDCCH to decode the DCI. Other's UEs can be configured with different DMRS scrambling ID for PDCCH to decode their DCI. As a result, there is no confusion with the RNTIs of other UEs, because a UE cannot decode the DCI to perform the CRC check without using the configured UE-specific DMRS scrambling ID.

The values for the set of offsets may be configured by higher layer signaling or alternatively can be dynamically configured or specified in a standard.

The number of PDCCH/DCI repetitions, N, can be signaled via higher layer signaling or implicitly signaled to UE via some other property, e.g. number of UE-specific control resource sets (CORESETs), number of HARQ entities, etc.

In some embodiments, each of the PDCCH repetitions is sent in a different CORESET which associates with a different TCI state (each TCI state providing corresponding QCL information). This may be applied in a situation where one CORESET has a single TCI state. More generally, the PDCCH repetitions may be sent in the same or different CORESETs, and/or with the same or different search spaces, and/or having the same or different TCI states. For example, one CORESET can be configured with multiple different TCI states, each associated with different search space.

Figure 4:
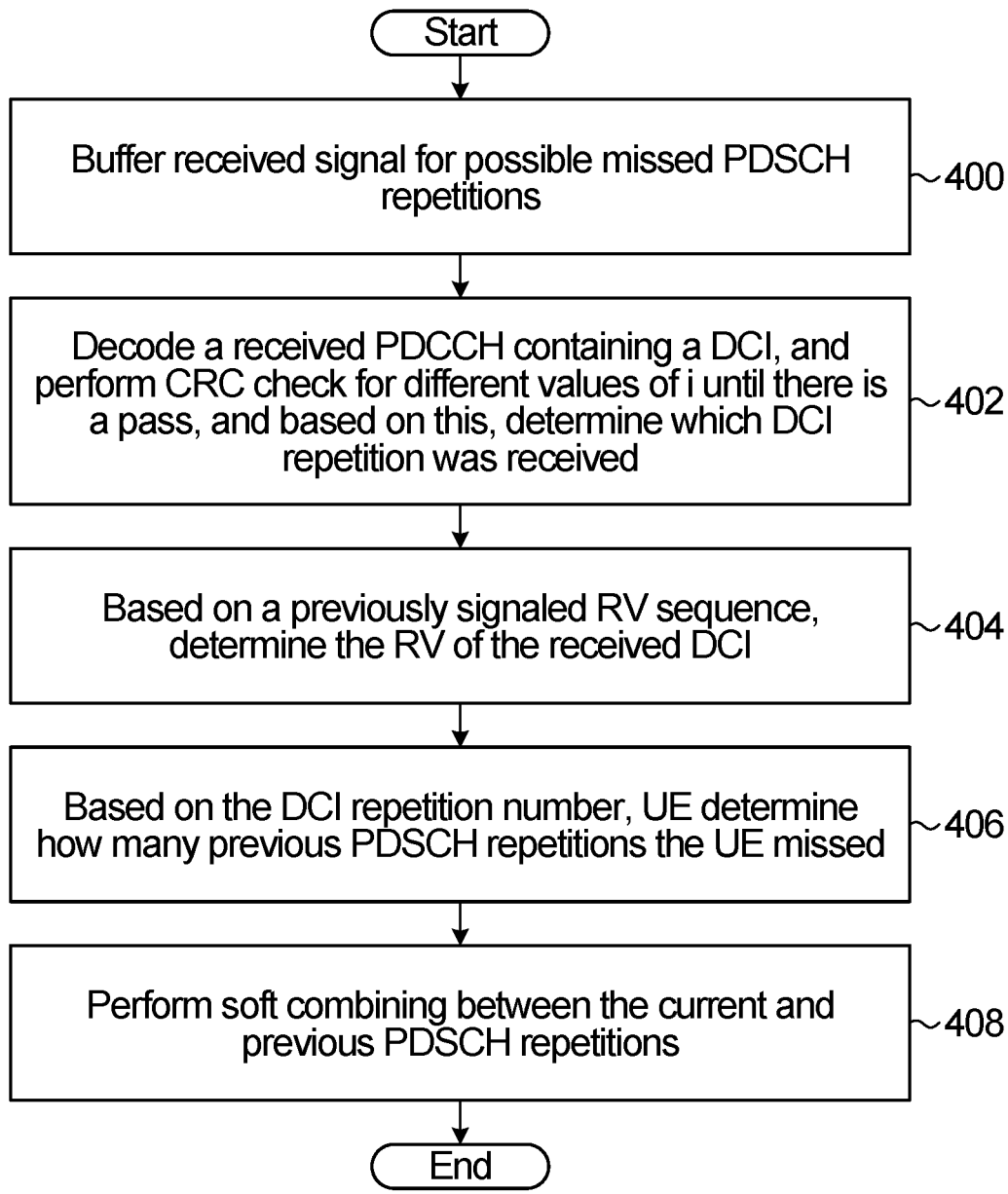
FIG. 4 is a flowchart of a method of processing received PDSCH or PUSCH repetitions.

An example of UE behavior will be described with reference to the flowchart of FIG. 4. In block 400, the UE buffers the received signal for possible missed PDSCH repetition(s). In some embodiments, the length or the size of the buffer is fixed, and a sliding window is used. The sliding window may be long or big enough to capture all missed repetitions, or only a fixed number which may be smaller than the maximum number of missed repetitions. The window size may be based on PDCCH monitoring period.

In block 402, the UE decodes a received PDCCH containing a DCI, and performs CRC check for different values of i until there is a pass, and based on this, the UE determines which PDCCH repetition was received. In addition, in block B04, based on a previously signaled RV sequence, the UE determines the RV of the received DCI. For example, if the PDCCH is identified to be the nth repetition, $n=0, \ldots, N_{PDCCH-1}$, where $n=0$ represents the first PDCCH transmission and $N_{PDCCH-1}$ is the number of PDCCH repetitions (including the first transmission), then the mth PDSCH/PUSCH transmission occasion with $m=n$ can be identified. In some embodiments, the corresponding RV used is based on the association between the mth transmission and the RV as discussed earlier for PDSCH/PUSCH repetition. In some embodiments, the number of PDCCH repetitions and the number of PDSCH/PUSCH repetitions can be different. In block 406, based on the PDCCH repetition number the UE determines how many previous PDSCH repetitions the UE missed. Based on the RV sequence, the UE can also determine the RV of the missed repetitions. In block 408, the UE performs soft combining between the current and previous PDSCH repetitions.

Although the example above has been focused on PDSCH transmission, a similar approach can be applied to PUSCH repetition, where the DCI formats for UL grant are CRC scrambled with identifier=g(RNTI, f(i)), where $i=0, 1, \ldots N-1$ refers to the DCI repetition index, f(i) is a one-to-one mapping function of i, and g(RNTI, f(i)) is a function of radio network temporary identifier (RNTI) and f(i).

If UE knows the PDDCH repetition index, the UE knows which RV version of PUSCH should be used. For example, the PDCCH repetition index $i=1$ (which is the second PDCCH) is decoded and if RV sequence=(0, 2, 3, 1) are specified for the 1st, $2^{nd}$, $3^{rd}$ and $4^{th}$ PUSCH repetition transmission, respectively, then UE knows and NW expects that RV=2 should be used because if PDCCH repetition index is not available, then UE thinks that it should transmit PUSCH with RV=0, while NW expects RV=2.

Or the first RV in the RV sequence can be used, as soon as UL grant is detected (even if it is the $2^{nd}$ DCI), in this case, the NW needs to perform blind decoding of PUSCH with different RV values because if NW does not decode the first expected PUSCH, it may be that UE missed the $1^{st}$ PDCCH, hence does not transmit the first PUSCH, or UE sends the first PUSCH but NW cannot decode it. If the UE has missed the first PDCCH, then NW expects the $2^{nd}$ PUSCH with $2^{nd}$ RV, whereas the UE uses the $1^{st}$ RV. If the NW fails to decode the first PUSCH, the UE uses the $2^{nd}$ RV for the $2^{nd}$ PUSCH transmission, so it is possible that the NW expects the $2^{nd}$ RV, but the UE uses the $1^{st}$ or $2^{nd}$ RV depending on the scenarios just discussed. In other embodiments, RV=0 can be used in all PUSCH repetition using the new rv_id or modify existing rv_id to associate with RV sequence with all RVs are 0.

As before, the values for the set of offsets may be configured by higher layer signaling or specified in standard, or by dynamic signaling.

Different DCI Repetition Indexes Associated with Different CCE Indexes

In another embodiment, different DCI repetition indexes are associated with different control channel elements (CCEs). A CORESET is a set of time-frequency resources for DCI transmission. The CORESET is divided into CCEs, and each CCE has a CCE index. Typically, a CCE is defined by a number of resource blocks in frequency for some number of symbols in time. In some embodiments, the CCE used to transmit a DCI is associated with the DCI repetition index, such that once a UE receives a DCI on a specific CCE, the UE can determine the DCI repetition index.

In a very specific example, from section 10.1 in 3GPP TS 38.213 V15.2.0 (2018-06), for a search space set S associated with control resource set p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i$$

Where for any common search space, $Y_{p,n_{s,f}^{\mu}}=0$; for a UE-specific search space, $Y_{p,n_{s,f}^{\mu}}=(A_p \cdot Y_{p,n_{s,f}^{\mu}-1}) \mod D$, $Y_{p,-1}=n_{RNTI} \neq 0$, $A_0=39827$ for p mod $3=1$, $A_1=39829$ for p mod $3=1$, $A_2=39839$ for p mod $3=2$, and $D=65537$; $i=0, \ldots, L-1$; $N_{CCE,p}$ is the number of CCEs, numbered from 0 to $N_{CCE,p}-1$, in control resource set p; $n_{CI}$ is the carrier indicator field value if the UE is configured with a carrier indicator field by higher layer parameter CrossCarrierSchedulingConfig for the serving cell on which PDCCH is monitored; otherwise, including for any common search space, $n_{CI}=0$; $m_{s,n_{CI}}=0, \ldots, M_{p,s,n_{CI}}^{(L)}-1$, where $M_{p,s,n_{CI}}^{(L)}$ is the number of PDCCH candidates the UE is configured to monitor for aggregation level L for a serving cell corresponding to $n_{CI}$ and a search space set s; for any common search space, $M_{p,s,max}^{(L)}=M_{p,s,0}^{(L)}$; for a UE-specific search space, $M_{p,s,max}^{(L)}$ is the maximum of $M_{p,s,n_{CI}}^{(L)}$ over all configured $n_{CI}$ values for a CCE aggregation level L of search space set s in control resource set p; the RNTI value used for $n_{RNTI}$ is defined in [5, TS 38.212] and in [6, TS 38.214].

Rather than using a UE's RNTI in the equations above to determine CCE indexes for all repetitions, in some embodiments, an identifier=g(RNTI, f(i)) is used to determine CCE index instead of $n_{RNTI}$. In a specific example, the identifier g is used in place of $n_{RNTI}$ in the expression for $Y_{p,-1}$. In this way, a repetition specific CCE index is employed. In some embodiments, additionally, CRC scrambling can still be based on:
the same RNTI for all PDCCH repetitions with the same content for possible soft combining, or
g(RNTI, f(i)) as in previously described embodiments.

In another embodiment, a new parameter is introduced in the equation for CCE index. In a specific example, a value $n_{PDCCHindex}=h(i)$ is added after $n_{CI}$ in the equation above, where h(i) is a one-to-one mapping function of i, $i=0, 1, \ldots N-1$ and the values can be configured by higher layer signaling, where the value reflects DCI index.

In another embodiment, different PDCCH/DCI repetition indexes are signaled by using different DMRS sequence IDs.

In some embodiments, different DCI repetition indexes are signaled by using different rv values. In this case, the value $RV_{id}$ in a DCI is associated with only one rv value, and not an RV sequence as described herein for some other embodiments. In this case, the UE needs to be configured/signaled how to interpret the rv value in DCI, e.g. in higher layer signaling (RRC, RRC+MAC CE)

There is a fixed relation between rv value and the nth transmission, e.g. $n=0, 1, 2, 3$ is associated with rv values=0, 2, 3, 1, respectively. Other sets of values are possible, but they need to be unique.

For this specific example, if the UE receives a DCI with rv value in RV field as 2, then UE knows that it is the 2nd DCI and the corresponding data PDSCH/PUSCH is the 2nd one, so the UE can go back to recover the first PDSCH/PUSCH sent earlier with rv=0.

In some embodiments, the PDCCH repetition and the PDCCH repetition indexing discussed above apply to PDCCH carrying e.g. UE-specific DCI, group common DCI for a group of UEs.

Figure 5:
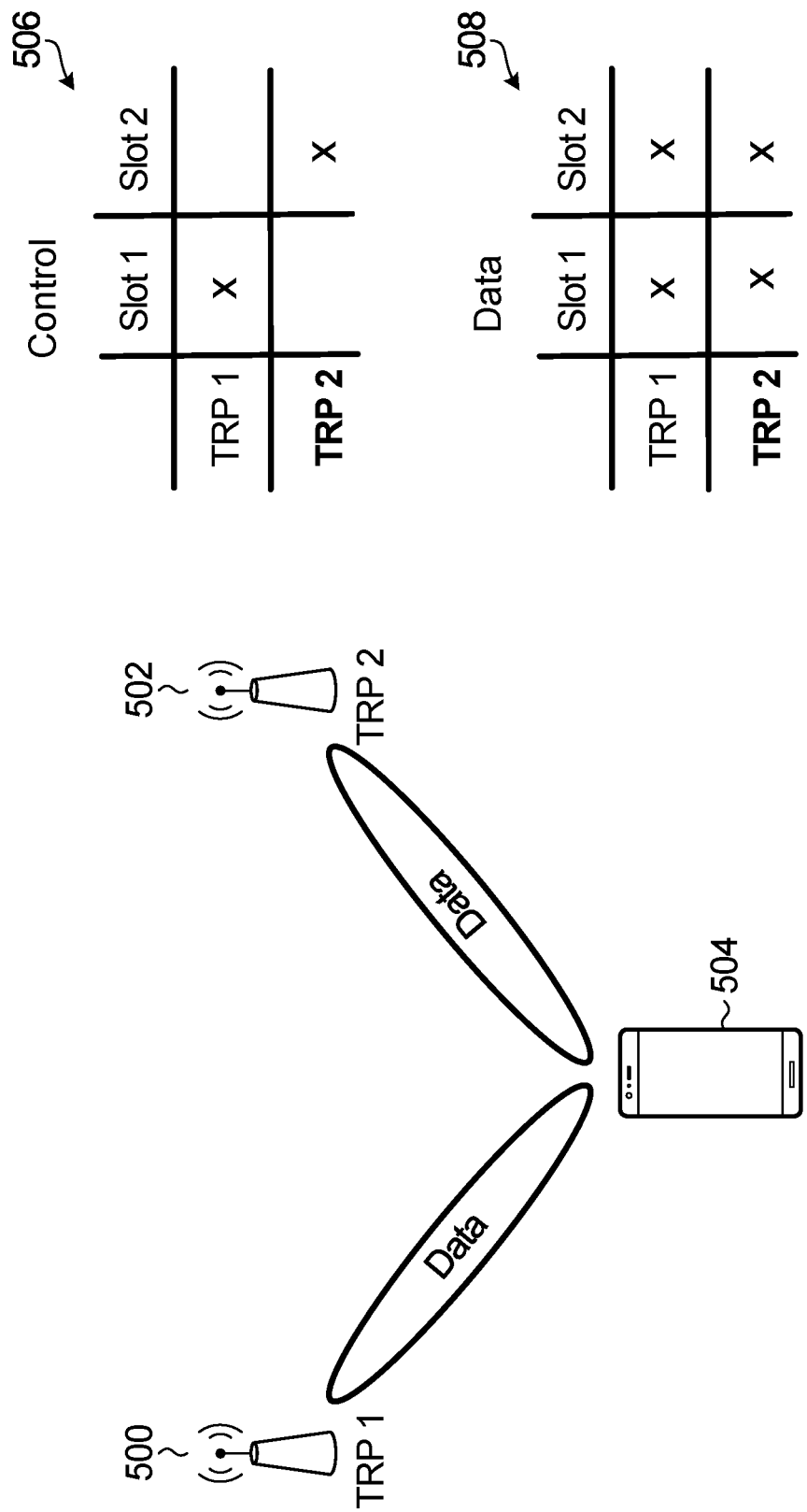
FIG. 5 to FIG. 7 are examples of PDSCH/PUSCH association in time and space diversity domains where there is repetition in both PDCCH and PDSCH/PUSCH.

Multiple DCIs and Multiple PDSCHs/PUSCHs Association in Case of Repetitions of Both PDCCHs and PDSCHs/PUSCHs—One DCI Per Time Slot In some embodiments, multiple DCI repetitions are transmitted. There is one DCI repetition in each time slot, and each DCI includes information for all the data transmissions corresponding to data repetition. A specific example will be described with reference to FIG. 5. In the example of FIG. 5, a single UE 504 is in communication with TRP1 500 and TRP2 502. This is a specific example of spatial diversity, where the spatial dimension spans two TRPs. For this example, the time dimension spans 2 slots, labelled slot 1 and slot 2, but the same approach can be used for other time units.

Control signaling is generally indicated at 506, and data transmission is generally indicated at 508. The control signaling includes a PDCCH/DCI 1 transmitted from TRP1 in slot 1, and a PDCCH/DCI 2 transmitted from TRP2 in slot 2.

In slot 1, for control, DCI 1 has QCL information for data from both TRPs via a transmission configuration indicator (TCI) state field in DCI 1. The TCI state field may include two TCI state subfields for the two transmissions. Alternatively, or the UE may be configured to interpret the TCI value in the TCI state field as a TCI configuration in accordance with previously transmitted higher layer signaling that maps TCI state values to QCL information for both TRPs.

In slot 1, for data, a first set of PDSCH repetitions is transmitted simultaneously from the two TRPs.

In a first option for control transmission in slot 2, DCI 2 has the same content as DCI 1, but CRC scrambled by identifier=g(RNTI, f(i)), where depending of the function of g(*) and f(*), the DCIs may be soft combined as discussed earlier. With this approach the UE can recover the PDSCH repetitions for the earlier missed DCI as in previously described embodiments.

In a second option for control transmission in slot 2, DCI 2 again has the same content as DCI 1. DCI 2 is transmitted using the same or different CORESET and/or search spaces as DCI 1, and contains the same QCL information for data from both TRPs via TCI state field in DCI using the same RNTI as in DCI 1. In this case, the two DCIs can be soft combined (but based on a possible restriction on blind decoding pair of DCIs). With this second option, if DCI 2 is decoded and DCI 1 is missed then the UE will not know about the earlier PDSCH repetition associated with DCI 1. The same set of RVs may be used for the first and second set of PDSCH repetitions. The different sets of RVs may also be used for different sets of PDSCH repetitions, and the UE attempts to process both sets to decode the PDSCH. However, if DCI 2 itself is not decodable until after soft combining with DCI 1, then the UE knows there are two DCIs, and can go on to process the PDSCH repetitions.

In slot 2, for data, a second set of PDSCH repetitions is transmitted simultaneously from the two TRPs.

For this embodiment, the UE is configured with the time line of PDSCH repetitions, e.g. N1 at the same time repeated in spatial domain, with N2 different slots/mini slots, with the total number of repetitions=N1*N2 or configured with mode SSTT discussed above. In another embodiment, repetition in another diversity domain, such as frequency domain or code domain, is also employed. For example, N3 can be introduced that indicates the number of repetitions in frequency, or other parameters for code-domain.

In some embodiments, the number of repetitions in at least space (N1), time (N2), frequency (N3), with the total number repetitions=N1*N2*N3 is configured using one of:
High layer signaling (e.g., RRC signaling);
High layer signaling in combination with dynamic signaling. In this case, different possible configurations can be conveyed via RRC signaling, and a particular one of the possible configurations is selected by DCI;
Preconfiguration, such as a standard specification.
Or implicitly signaled by the number of values for each domain, e.g. 2 TCI states are configured/signaled, then N1=2 is implied.

This can be used to indicate how the repetitions are mapped to the space, time and frequency domains. For example, where four repetitions are to be sent using time and space diversity over two time slots and using two TRPs, the repetitions may repeat in space first and then time. In this case, PDSCH repetition would take place as follows:
Repetition 1: TCI state 1 (associated with TRP1), time 1
Repetition 2: TCI state 2 (associated with TRP2), time 1
Repetition 3: TCI state 1 (associated with TRP1), time 2
Repetition 4: TCI state 2 (associated with TRP2), time 2.

The UE can determine TCI states using a one-to-one mapping applied to a received TCI configuration for simultaneously received PDSCH repetitions. For example, TCI configuration 1 may indicate 2 TCI states (TCI state 1 and TCI state 2) corresponding PDSCH repetitions in slot n, with the same TCI states), corresponding to PDSCH repetitions in slot n+1. Similarly, the UE can determine DMRS sequence IDs using a one to one mapping applied to a received DMRS sequence ID configuration for simultaneously received PDSCH repetitions. For example, DMRS scrambling ID configuration may indicate scrambling IDs (ID1 and ID2) corresponding to PDSCH repetition in slot n, with the same scrambling IDs corresponding to PDSCH repetitions in slot n+1.

Multiple DCIs and Multiple PDSCHs/PUSCHs Association in Case of Repetitions in Both PDCCHs and PDSCHs/PUSCHs—Multiple DCI Per Time Slot In some embodiments, multiple DCI repetitions are transmitted. There are multiple DCI repetitions in each time slot, and each DCI includes information for all the data transmissions that occur in the slot.

Figure 6:
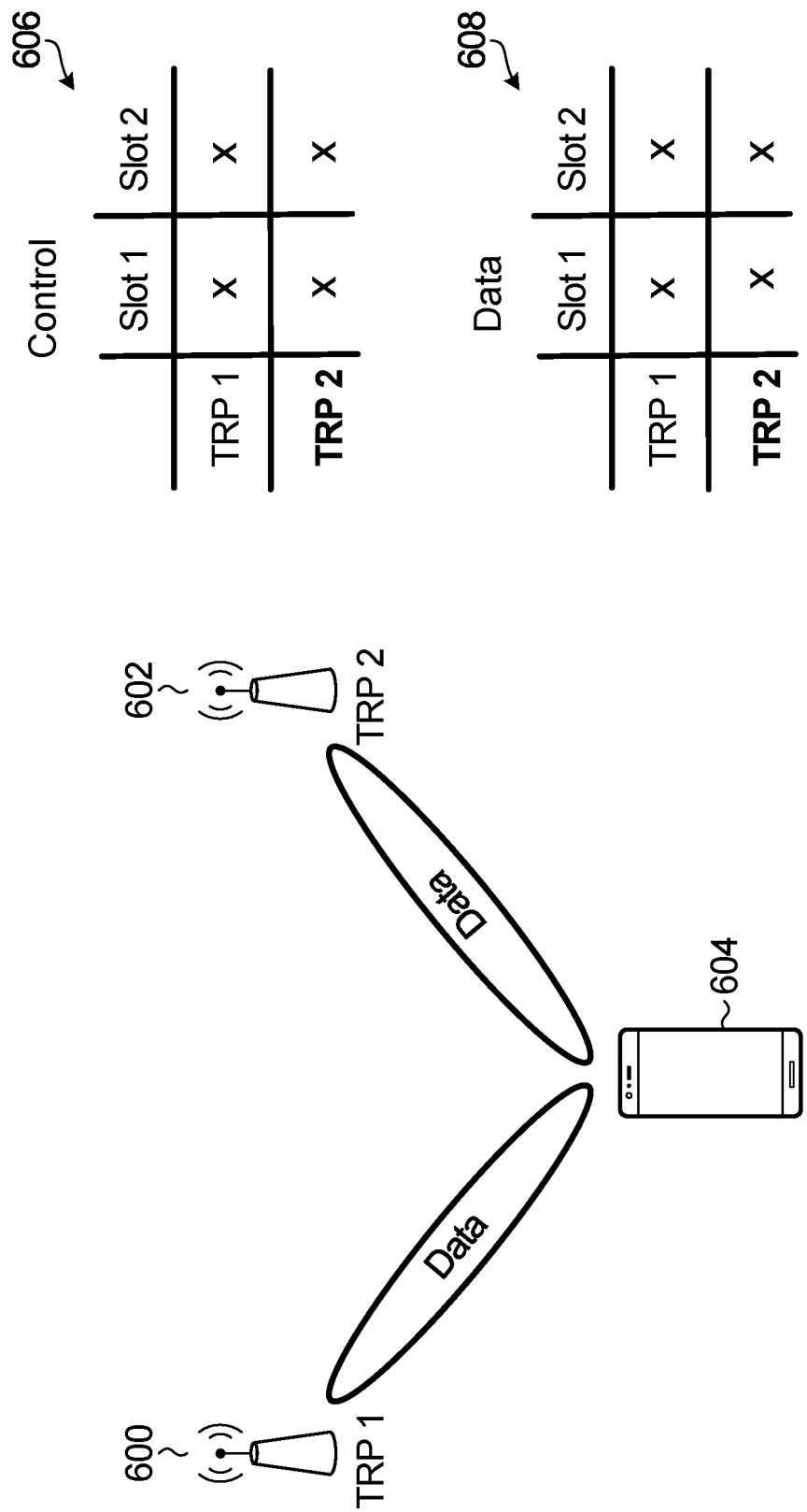

A specific example will be described with reference to FIG. 6. In the example of FIG. 6, a single UE 604 is in communication with TRP1 600 and TRP2 602. This is a specific example of spatial diversity, where the spatial dimension spans two TRPs. For this example, the time dimension spans 2 slots, labelled slot 1 and slot 2, but the same approach can be used for other time units.

Control signaling is generally indicated at 606, and data transmission is generally indicated at 608. The control signaling includes a DCI 1 transmitted from TRP1 in slot 1, a DCI 2 transmitted from TRP2 in slot 1, a DCI 3 transmitted from TRP1 in slot 2, and a DCI 4 transmitted from TRP2 in slot 2.

In slot 1, for control, each of DCI 1 and DCI 2 (sent in same or different CORESET and/or search spaces as DCI 1) contains QCL information for data from both TRPs via a transmission configuration indicator (TCI) state field. The UE interprets the TCI value in the TCI state field as TCI configuration in accordance with previously transmitted higher layer signaling that maps TCI values to QCL information for both TRPs.

In slot 1, for data, a first set of PDSCH repetitions is transmitted simultaneously from the two TRPs.

In a first option for control transmission in slot 2, DCI 3 and DCI 4 have the same content as DCI 1 and DCI 2, but CRC scrambled with RNTI+i*Offset. With this approach the UE can recover the PDSCH repetitions for the earlier missed DCI as in previously described embodiments.

In a second option for control transmission in slot 2, DCI 3 and DCI 4 again have the same content as DCI 1 and DCI 2. DCI 3 and DCI 4 have the same QCL information for data from both TRPs via TCI state field in DCI using the same RNTI as in DCI 1. In this case, the two DCIs can be soft combined.

In slot 2, for data, a second set of PDSCH repetitions is transmitted simultaneously from the two TRPs.

For this embodiment, the UE is configured with the time line of PDSCH repetitions, e.g. N1 at the same time repeated in spatial domain, with N2 different slots/mini slots, with the total number of repetitions=N1*N2. In another embodiment, repetition in another diversity domain, such as frequency domain or code domain is also employed. For example, N3 can be introduced that indicates the number of repetitions in frequency, or other parameters for code-domain.

Multiple DCIs and Multiple PDSCHs/PUSCHs Association in Case of Repetitions in Both PDCCHs and PDSCHs/PUSCHs—One DCI Per Time Slot and One Data Transmission Per Time Slot In some embodiments, multiple DCI repetitions are transmitted, but there is a single DCI repetition in each time slot. DCI includes information for all the data transmissions that occur in the multiple time slots.

Figure 7:
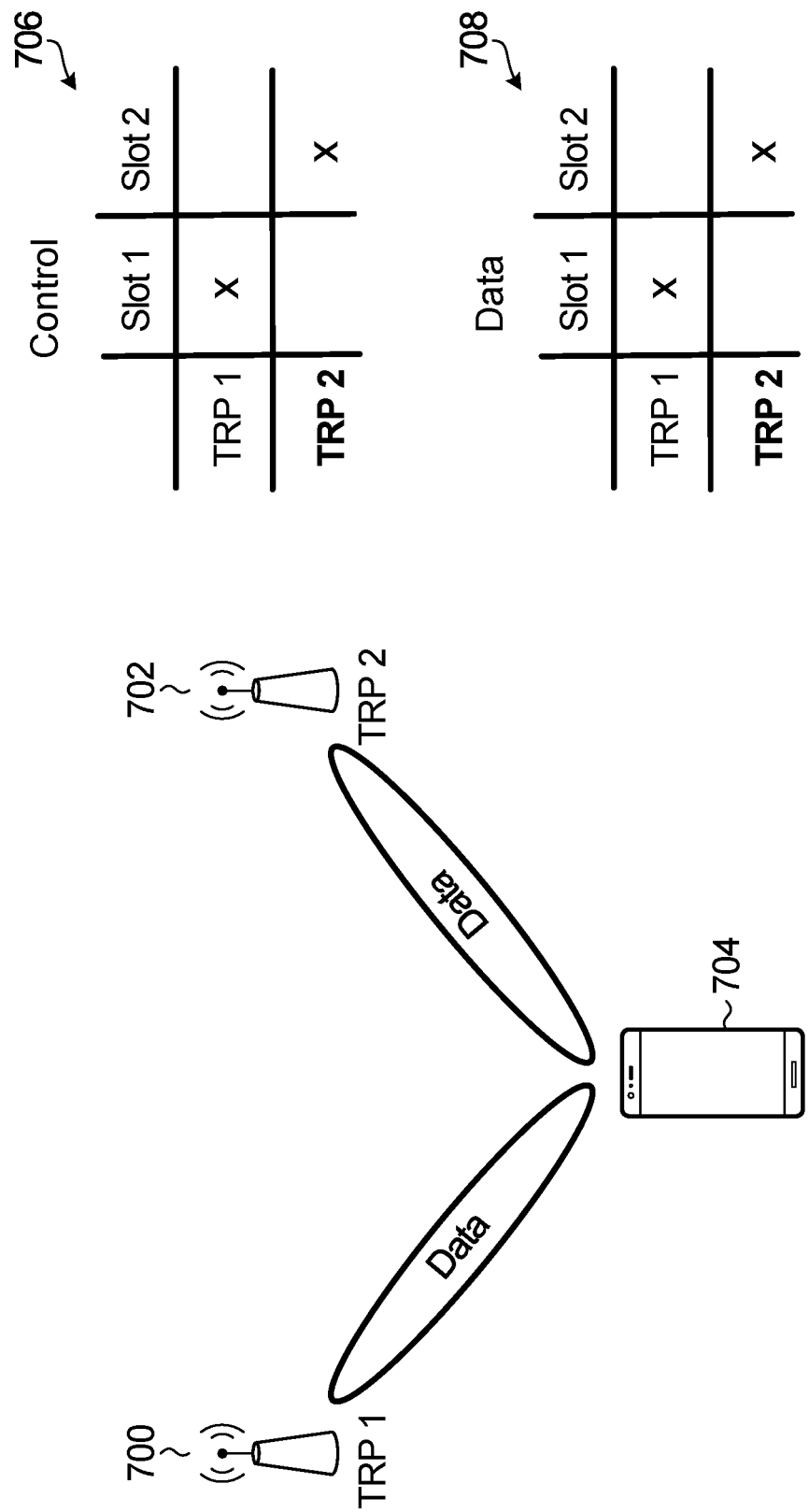

A specific example will be described with reference to FIG. 7. In the example of FIG. 7, a single UE 704 is in communication with TRP1 700 and TRP2 702. This is a specific example of spatial diversity, where the spatial dimension spans two TRPs. For this example, the time dimension spans 2 slots, labelled slot 1 and slot 2, but the same approach can be used for other time units. This can be considered as mode TTSS as discussed earlier.

Control signaling is generally indicated at 706, and data transmission is generally indicated at 708. The control signaling includes a DCI 1 transmitted from TRP1 in slot 1, and DCI 2 transmitted from TRP2 in slot 2.

In slot 1, for control, DCI 1 contains QCL information for data from both TRPs via a transmission configuration indicator (TCI) state field. The UE interprets the TCI value in the TCI state field as TCI configuration in accordance with previously transmitted higher layer signaling that maps TCI values to QCL information for both TRPs.

In slot 1, for data, a first PDSCH repetition is transmitted from TRP1.

In a first option for control transmission in slot 2, DCI 2 has the same content as DCI 1, but its CRC is scrambled with a different identifier g(RNTI)+f(i)) as detailed for other embodiments. With this approach the UE can recover the PDSCH repetition for the earlier missed DCI as in previously described embodiments.

In a second option for control transmission in slot 2, DCI 1 again has the same content as DCI 2, sent in the same or different CORESET and/or search spaces as DCI 1, and contains the same QCL information for data from both TRPs via TCI state field in DCI using the same RNTI as in DCI 1. In this case, the two DCIs can be soft combined, subject to any possible restriction on blind decoding a pair of DCIs.

In slot 2, for data, a second PDSCH repetition is transmitted from the TRP 2.

For this embodiment, the UE is configured two spatial information, and mode TTSS, and the UE follows the mapping between the nth transmission and diversity domains, and between the nth transmission and the RV sequence. Both DCIs contain the same information, so if one is missed, the detection of another can be used to identify the missed PDSCH/PUSCH sent earlier.

In some embodiments, the PDCCH repetition together with PDSCH/PUSCH repetition discussed above apply to PDCCH carrying e.g. UE-specific DCI, group common DCI for a group of UEs, and group-common data to a group of UEs.

PDSCH Repetition in Frequency in the Same Time Allocation

In some embodiments, PDSCH repetition occurs using different frequency resources in the same time allocation. In this case, the DCI specifies time frequency resources. In some embodiments, the DCI specifies time frequency resources for the first repetition including for example the specification of a starting resource block (RB) or RB_start, and the next repetition in the same time unit occurs with a frequency resources associated with a different frequency resources RB_start+RB_offset, where RB_start is given in DCI and RB_offset is configured or signaled. For example, RB_start+RB_offset may be the starting RB for a set of resource blocks for the second repetition in the same time unit.

The DCI repetition together with data repetition is also possible as in above examples with spatial domain instead of frequency domain.

In some embodiments, the repetition in frequency happens with a configured frequency offset within a single bandwidth part.

In another embodiment, the repetition in frequency happens in multiple bandwidth parts, necessitating cross-BWP scheduling. The DCI may indicate resources to use within a given bandwidth part relative to the start of the bandwidth part. It may be necessary to allocate a suitable time interval between repetitions to allow for BWP switching.

One DCI in one BWP or multiple DCIs in one or multiple BWPs can be used to schedule PDSCH/PUSCH with or without repetition.

In either case (intra-BWP repetition, or cross-BWP repetition), the repetitions may be transmitted from the same or different TRPs/beams.

For these embodiments, the UE needs to know whether the repetition is in time or frequency, and if in frequency what is the offset within BWP, or between BWPs. This information can be specified in a standard or signaled/configured by higher layer signaling (e.g. RRC, RRC+MAC CE), or dynamic signaling, or combination. The same approach is applicable to PUSCH transmission as well, when there is at least one active BWP.

Figure 8:
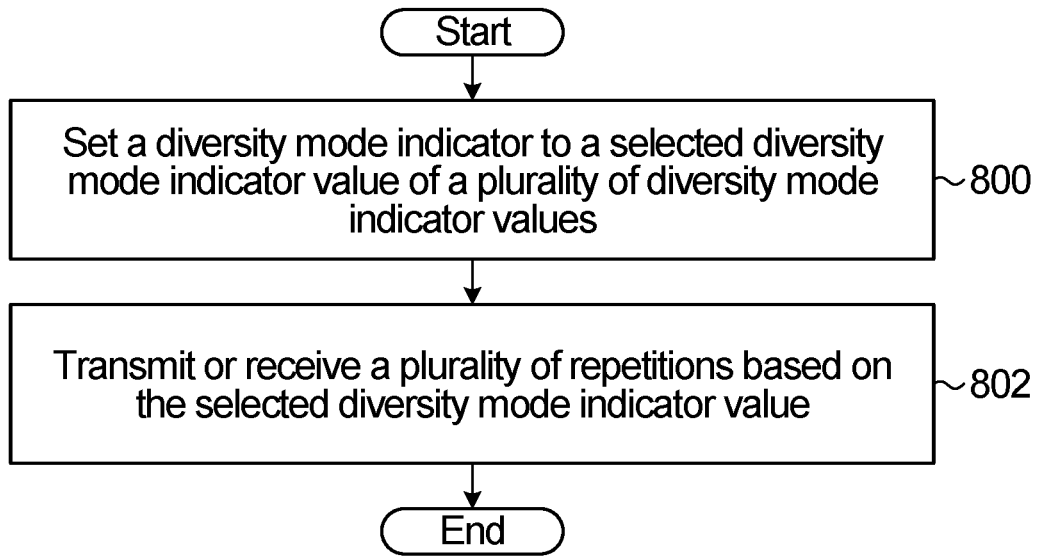
FIG. 8 is a flowchart of another method of transmitting PDSCH or PUSCH repetitions.

FIG. 8 is a flowchart of another method of transmitting PDSCH or PUSCH repetitions. The method begins in block 800 with setting a diversity mode indicator to a selected diversity mode indicator value of a plurality of diversity mode indicator values. Each diversity indicator value is associated with a respective combination of one or more diversity domains for data repetition. Each diversity indicator value is associated with rules that specify behavior for data repetition in terms of the order that repetitions take place using the respective combination of one or more diversity domains. The method continues in block 802 with transmitting or receiving a plurality of repetitions based on the selected diversity mode indicator value.

Figure 9:
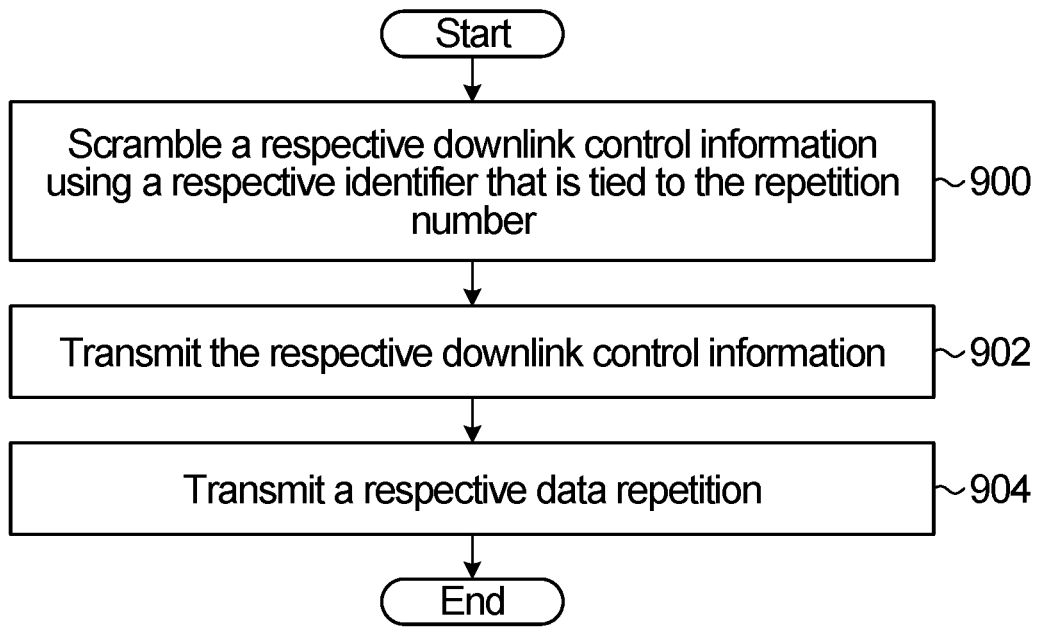
FIG. 9 is a flowchart of a method of implicitly signaling RV index using scrambling sequence identifier.

FIG. 9 is a flowchart of a method of implicitly signaling RV index using scrambling sequence identifier. The method shows steps that are performed for each of a plurality of repetitions having a respective repetition number. The method begins in block 900 with scrambling a respective downlink control information using a respective identifier that is tied to the repetition number. Block 902 involves transmitting the respective downlink control information; and block 904 involves transmitting a respective data repetition.

Figure 10:
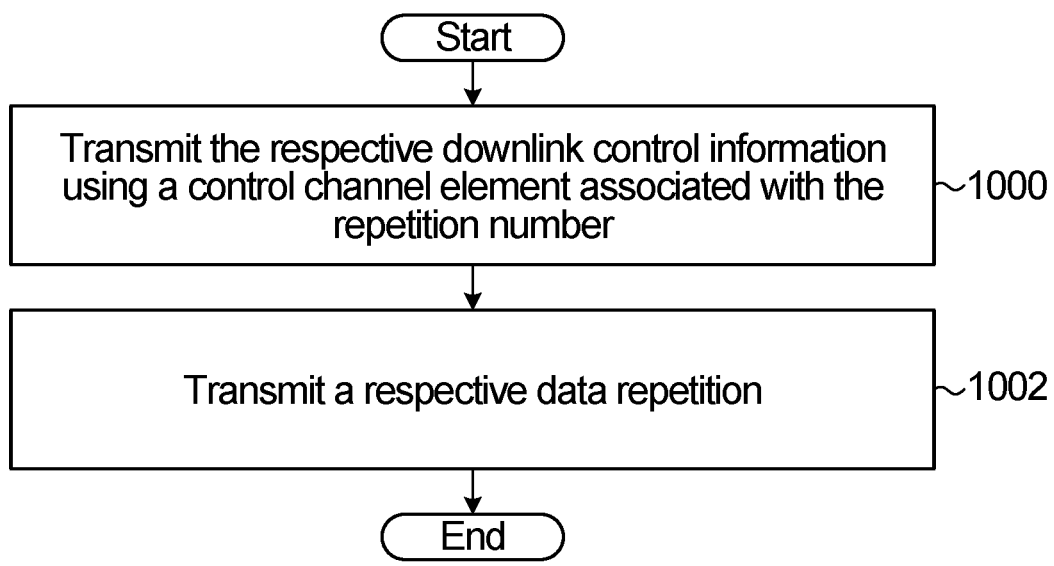
FIG. 10 is a flowchart of a method of implicitly signaling RV index using CCE.

FIG. 10 is a flowchart of a method of implicitly signaling RV index using CCE. The method shows steps that are performed for each of a plurality of repetitions having a respective repetition number. The method begins in block 1000 with transmitting the respective downlink control information using a control channel element associated with the repetition number. The method continues in block 1002 with transmitting a respective data repetition.

Multiple Precoders for Repetition

The R15 mechanism for supporting multiple PDSCH repetitions mentioned earlier has drawbacks. As agreed upon in R15, DCI is transmitted once for all PDSCH repetitions. Only one field of precoding information and number of layers is defined in the DCI, which provides both precoding information and number of layers. The one field of precoding information and number of layers has only one precoding information. Because a QCL information defines direction for a particular transmission point or beam, if there is only one precoding information, all repetitions are considered to be transmitted from one TRP or one beam.

Accordingly, there is a desire for an improved method of supporting multiple PUSCH repetitions transmitted to multiple TRPs or multiple beams.

Aspects of the present disclosure provide mechanisms to inform an electronic device, such as a user equipment (UE), of multiple precoding information, thereby allowing a repetition of physical uplink shared channel (PUSCH) information to be transmitted to multiple transmit receive points (TRPs) using multiple precoders or beams. More generally, the present disclosure provides mechanisms to inform the UE of various different transmission parameters used for configuring the UE for transmitting a repetition of PUSCH information to multiple TRPs, e.g. using multiple precoders or beams. Other types of transmission parameters may include redundancy version, antenna ports, modulation order, demodulation reference signal (DMRS) initialization, and phase-tracking reference signals (PTRS)-DMRS association. Several different processes are disclosed for informing the UE of the transmission parameters. In the particular case of precoding information, the multiple precoding information, each precoding information associated with a respective TRP or beam, or both, and the precoding information are provided to the UE. With different precoding information, each precoder can be associated with a different TRP or beam. In some embodiments, the precoding information can be provided to the UE using dynamic signaling by downlink control information (DCI). In some embodiments, the precoding information can be provided to the UE using a combination of semi-static signaling and dynamic signaling, for example using DCI. Two particular examples of semi-static signaling are radio resource control (RRC) signaling and a combination of RRC signaling together with a media access control (MAC) control element (CE). The combination of semi-static signaling and dynamic signaling may include providing the UE predefined configurations of precoding information or DMRS ports/port groups, or both, using higher layer signaling. The higher layer signaling may include RRC or RRC and MAC CE. A particular configuration can then be selected from the predefined configurations by dynamic signaling using the DCI. In some embodiments, a UE predefined configuration of precoding information or DMRS ports/port groups, or both, may be specified in a standard or otherwise known to the UE. In some embodiments, one configuration can be selected from a set of predefined configurations of precoding information or DMRS ports/port groups, or both, and the selected configuration can be indicated to the UE by higher layer signaling. In some embodiments, the precoding information can be provided to the UE using signaling discussed above that includes the precoder information and at least one other parameter. In some embodiments, one other parameter can be the number of data layers.

The following paragraphs provide context in the form of the description of an overall system that includes both base stations and electronic devices served by the base stations.

As described above, downlink control information (DCI) is transmitted in a PDCCH from the radio access network device, such as a base station, to the ED to provide the ED with information about specific physical layer parameters such as scheduling of downlink or uplink data, and other configuration parameters. The DCI may be transmitted using different DCI formats, which are designed for different purposes. Table 1 below shows examples of two different DCI formats used for scheduling of Physical Uplink Shared Channel.

TABLE 1

| DCI formats | |
| --- | --- |
| DCI format | Usage |
| 0_0 | Scheduling of PUSCH in one cell |
| 0_1 | Scheduling of PUSCH in one cell |

DCI format 0_0 is known as a "fallback" DCI format for scheduling of uplink data. Fallback DCI formats are intended for use in performing basic radio link set up or reconfiguration. They may include less information, e.g. the minimum amount of information to allow basic radio link set up or reconfiguration to occur. DCI format 0_1 is known as a "non-fallback" DCI format for scheduling of uplink data. Although embodiments of the present application may be described below with specific reference to certain types of non-fallback and fallback DCI, it should be understood that the disclosure more generally, aspects of the disclosure can be used with many different types of DCI. A particular additional DCI format may include a "compact" DCI that has a smaller payload size by using fewer fields and/or using fewer payload bits per field and thus fewer overall payload bits. In such a compact DCI, there may be fields containing the precoding information pattern configuration, AP pattern configuration or combined precoding information pattern and AP pattern configuration, that would be smaller than the corresponding fields in a DCI having format 0_1 or 0_0.

A DCI format generally includes a set of parameter fields, each having a defined bit length. In the description that follows, contents of the DCI may be referred to as fields or indications. Regardless of the terms that are used for transmission within the DCI, it should be understood that what is being described as the contents of the DCI would be consistent with how a DCI is formatted and transmitted between the radio access network device and UE.

Dynamic Signaling

Figure 11:
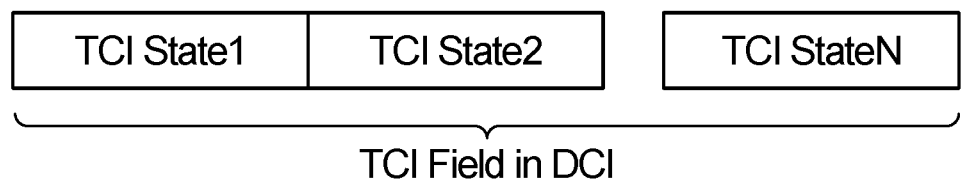
FIG. 11 is a block diagram illustrating an example of multiple precoding information or precoding information and number of layers in a precoding information and number of layers field included in downlink control information (DCI) according to an aspect of the disclosure.

In some embodiments, precoding information can be provided by the radio access network device to the UE using dynamic signaling by downlink control information (DCI). When using dynamic signaling via DCI, content of the DCI can include multiple precoding information indications, each indication associated with a particular precoding information. In some embodiments, the precoding indications may collectively form a single precoding information field or be considered separate precoding information fields, one for each precoding information indication of the DCI. Each precoding information indication can be k bits in length. The total number of bits for the precoding information field in the DCI is then equal to k*N, where N is the number of precoding information indications in the DCI. FIG. 11 illustrates a representation of a portion of a DCI that includes N precoding information indications identified as "precoding information 1" to "precoding information N". In some embodiments, the precoding information can be provided to the UE using signaling via DCI that includes the precoding information indication and at least one other parameter in a field. In some embodiments, one other parameter can be the number of data layers. In some embodiments, the multiple fields in DCI can each indicate the precoding information and number of data layers, or only the first one indicates both precoding information and number of data layers, and the rest only indicate the precoding information because for PUSCH repetition, the same number of data layers may be used in subsequent PUSCH repetitions. In some embodiments, the field size in bits for the multiple fields can be different sizes, for example the $2^{nd}$ field and so on can have smaller field size than the first field because they carry only precoding information.

The number of precoding information indications may be less than, equal to, or greater than a number K, K being a total integer number of PUSCH repetitions. When a number of precoding information indications (N) is equal to a number of PUSCH transmissions (K), the first precoding information, indicated by a first k bits of the precoding information field or precoding information and number of layers field, is associated with the first PUSCH transmission, the second precoding information, indicated by the next k bits of the precoding information field, is associated with the first PUSCH repetition, and so on. The Nth precoding information corresponds to the Kth PUSCH repetition, counting the first transmission as the $1^{st}$ PUSCH repetition.

When the number of precoding information indications (N) is less than the number of PUSCH transmissions (K), a pattern of the N precoding information indications can be repeated until the K repetitions have finished. If the number of K transmissions is evenly divisible by the number N of precoding information indications, an integer number of repetitions of the pattern results. If not, a fractional number of repetitions of the pattern results. For example, if there are K=4 repetitions and N=2 precoding information indications, then the first, second, third and fourth PUSCH repetitions are associated with precoding information1, 2, 1 and 2, respectively. It is also possible that the first, second, third and fourth PUSCH repetitions are associated with precoding information1, 1, 2 and 2, respectively. In some embodiments, the pattern can be signaled to the UE using RRC signaling. In some embodiments, the UE may be configured with a behavior or a rule that in conjunction with knowledge of the number of repetitions and the number of precoding information indications, the UE will use a set pattern based on the behavior.

When the number of precoding information indications (N) is greater than the number of transmissions (K), the precoding information indications can be applied to the respective repetitions, such that only K of the N precoding information indications are used.

In some embodiments, a same precoding information is used for more than one repetition of a set of repetitions. In some embodiments, the TCI state is different for each repetition.

When including the precoding information indications in the DCI, additional bits may be used in the DCI to accommodate the additional precoding information indications that are not present in existing DCI formats. Then UE can be pre-configured with knowledge of the number of precoding information indications or notified of the number, i.e. N, and in conjunction with knowledge of how many bits are in each precoding information indication, the UE will know how many additional bits are being used for the precoding information indications and thus the overall size in DCI for the precoding information. This may include creating a new configuration parameter or modifying an existing configuration parameter to enable the existing configuration parameter to provide the relevant information to the UE. An example of an additional configuration parameter is NumberofPrecodingandLayerInfoInDCI in Contro/ResourceSet. An example of configuring NumberofPrecodingandLayerInfoInDCI parameter may include indicating in the DCI a number of configured precoding information indications, or precoding information indications and number of layers, in the form {n0, n1, n2, n4}, where n0, n1, n2, n4 indicate there are zero, one, two or four precoding information states and zero, one, two or four layers. In some embodiments, the UE may be notified by higher layer signaling as part of the PUSCH configuration.

Multiple precoding information can be activated, modified or deactivated using RRC signaling or MAC-CE, or both. The use of RRC signaling or MAC-CE enables the list of precoding information to be changed as necessary. If the list of precoding information changes frequently due to a change of signal beams or TRPs, e.g. from UE movement, it may be advantageous to use MAC-CE instead of RRC signaling because MAC-CE may be able to more quickly configure the UE. In some embodiments, the number of precoding information is configurable. Configuring the number of active precoding information, and in some instances, the value of the precoding information, could be performed by RRC signaling or pre-defined based on DCI formats.

Figure 12:
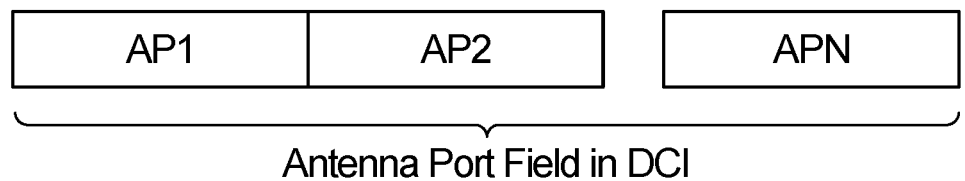
FIG. 12 is a block diagram illustrating an example of multiple antenna port (AP) indications in an AP field included in DCI according to an aspect of the disclosure.

In another embodiment, an antenna port indication can be added to the DCI or an existing antenna port field in the DCI can be modified to accommodate a number (N') of sets of antenna port(s) or antenna port group(s) associated with multiple repetitions of the PUSCH. Whenever antenna ports are referred to herein, it should be understood than this may also include antenna port groups. FIG. 12 illustrates a representation of a portion of a DCI that includes N' antenna port indications identified as AP1 to APN'.

In some examples, the number N of precoding information indications is the same as the number N' of antenna ports or antenna port groups, in which case the value of N' does not need to be explicitly signaled In such a case there is one-to-one mapping between antenna port indications and precoding information, i.e. AP1 to TCI state 1, AP2 to TCI state 2, and so on.

When N' is less than N, a new antenna port to precoding information association can be defined. If there is only a single antenna port or antenna port group, then the single port associates with the first precoding information for the first PUSCH transmission and the next precoding information in the DCI for the second transmission, and so on.

When the number of antenna ports N' is greater than one, but less than the number of precoding information indications N, then an association rule for the antenna port(s) or antenna port group(s) and the precoding information and UE behaviour can be defined and provided to the UE. In a particular example in which the number of antenna ports (P) is equal to 2 and the number of precoding information indications (N) equal 4, for example, the first, second, first and second antenna ports associate with the first, second, third and fourth PUSCH transmissions and the first, second, third and fourth precoding information associate with the first, second, third and fourth PUSCH transmissions. It is to be understood that there can be many different many-to-one mappings of antenna port(s) or antenna port group(s) and repeated PUSCH transmissions.

When N' is different from N, the association or mapping rule between precoding information indications and antenna port(s) or antenna port group(s) can be based on a pre-configured and known to the UE association or signaled via RRC signaling.

By allowing multiple precoding information and/or antenna port sets to be indicated to the UE in the DCI, patterns of precoding information associated with different PUSCH transmissions can be signaled to the UE dynamically. Similarly, the patterns of antenna port sets associated with different PUSCH transmissions can be signaled to the UE dynamically. The signaling of the patterns of either precoding information or antenna port sets allows choices of TRPs/beams for different PUSCH transmissions to change or adapt with changes in channel conditions.

Combined Semi Static and Dynamic Signaling

In some embodiments, the precoding information with/without the number of layers and/or antenna port(s) or antenna port group(s) are signaled to the UE using a combination of semi-static signaling (RRC or RRC+MAC CE) and dynamic signaling using DCI. Higher layer signaling can be used to define a list of precoding information pattern configurations, a list of antenna port pattern configurations or a list of combined precoding information and antenna port pattern configurations. In some embodiments, the list of precoding information pattern configurations, antenna port pattern configurations or combined precoding information and antenna port pattern configurations can be signaled by RRC signaling. In some embodiments, RRC signaling can be used to provide the list of precoding information pattern configurations, antenna port pattern configurations or combined precoding information and antenna port pattern configurations, and then media access control (MAC) control elements (CE) can be used to activate a subset of the list of pattern configurations.

Figures 13C, 14:
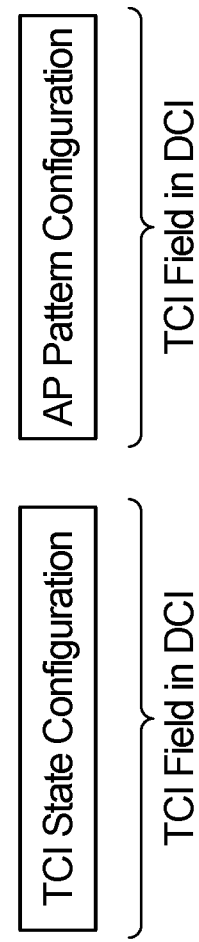
FIG. 13C is an example table illustrating combined precoding information patterns and AP patterns with associated configuration indices according to an aspect of the disclosure.
FIG. 14 is a block diagram illustrating an example of precoding information configuration information in a precoding information field and AP pattern configuration information in an AP field that are included in DCI according to an aspect of the disclosure.

Examples of lists of precoding information pattern configurations, antenna port pattern configurations, and combined TCI state and antenna port pattern configurations are shown in the tables of FIGS. 13A, 13B and 13C.

Referring to FIG. 13A, each row of the table in FIG. 13A includes a precoding information pattern and an associated precoding information configuration index. The precoding information in the pattern are identified by particular identifiers, i.e. precoding information ID #, where the ID # can be from all defined precoding information or only active precoding information. In a particular example, there are a total of 8 precoding information defined, and the ID can range from 0 to 7. Precoding information can only be selected from a subset of active precoding information IDs. In an example where there are 8 precoding information, and 4 activated precoding information, then the precoding information ID can be 0 to 3. The precoding information ID 0 may associate with the lowest active precoding information ID from the 8 total precoding information, and so on. A first row of the table includes a precoding information configuration index equal to "0" and a precoding information pattern including precoding information ID1 and precoding information ID2. A second row of the table includes a precoding information configuration index equal to "1" and a precoding information pattern including precoding information ID2 and precoding information ID3. A third row of the table includes a TCI configuration index equal to "2" and a precoding information pattern including precoding information ID1, precoding information ID3 and precoding information ID2. A fourth row of the table includes a precoding information configuration index equal to "3" and a precoding information state pattern including precoding information ID1, precoding information ID1, precoding information ID2 and precoding information ID2. The index associated with the precoding information pattern described above could be coded in the DCI. The DCI bit field size can be fixed or ceil(log 2(# precoding information pattern configurations)). For example, if the number of active patterns is 8, the bit field size would be three and the coded value in the DCI would range from 000 to 111.

FIGS. 13B and 13C include similar tables of four patterns, each pattern with an associated configuration index. The table of FIG. 13C includes pairs of precoding information pattern and AP pattern, each pair having an associated configuration index.

It is to be understood that the example tables shown in FIGS. 13A, 13B and 13C are not intended to be any way limiting. The number of precoding information or AP values in a pattern can vary from 1 to M, where M is a maximum number of precoding information or AP values that are allotted for a pattern. Any combination, arrangement or repetition of precoding information or AP values could be included in a respective precoding information or AP value pattern. Although the tables in FIGS. 13A, 13B and 13C, each have only 4 rows in the respective tables, it is to be understood that there could be more or fewer rows in the table.

In some embodiments, the UE may be pre-configured with lists of precoding information pattern configurations, antenna port pattern configurations, or combined precoding information and antenna port pattern configurations. In such embodiments, neither RRC signaling nor RRC signaling and MAC CE are utilized. In some embodiments, the UE may be pre-configured with a precoding information pattern configuration, antenna port pattern configuration, or combined precoding information and antenna port pattern configuration, or provided with such information using higher layer parameters. When referring to the UE being pre-configured in information such as lists of precoding information pattern configurations, antenna port pattern configurations, or combined precoding information and antenna port pattern configurations, it is to be understood that the information may be from an agreed upon telecommunication standard that identifies particular lists. In such embodiments, where the UE is pre-configured with information, the DCI is used to select one of the pre-configured options.

In some embodiments, the UE may be provided with a list of precoding information pattern configurations, a list of antenna port pattern configurations or a list of combined precoding information and antenna port pattern configurations using a higher layer parameter. In such embodiments, where the UE is configured with information by a higher layer parameter, the DCI is used to select one of the configured options. In some embodiments, new higher layer parameters can be included with an existing set of configuration parameters used for configuring the PUSCH to make a list of precoding information pattern configurations, by adding/modifying/releasing a precoding information pattern configuration. In some embodiments, new higher layer parameters can be included with an existing set of configuration parameters used for configuring the other channels in addition to the PUSCH, to make a list of precoding information pattern configurations, by adding/modifying/releasing a precoding information pattern configurations. In some embodiments, a new higher layer parameter can be included with an existing set of configuration parameters used for configuring the PUSCH to notify UE on the existent of a list of precoding information pattern configurations.

In some embodiments, an existing higher layer parameter could be modified or a new higher layer parameter could be added to include a notification that a list of precoding information pattern configurations is being used to define a precoding information pattern, enabling the UE to interpret the precoding information field in DCI as a precoding information pattern configuration, not as a precoding information indication. In some embodiments, an existing higher layer parameter could be modified or added to include a notification that a list of antenna port pattern configurations is being used to define an AP pattern, enabling the UE to interpret the AP field in DCI as an AP pattern configuration, not as an AP port. In some embodiments, an existing higher layer parameter could be modified to include a notification that a list of combined precoding information and antenna port pattern configurations is being used to define a combined precoding information and AP pattern, enabling the UE to interpret the precoding information field or AP field, or both, in DCI as a combined precoding information pattern and AP pattern configuration, not as a precoding information or AP state. An example of an additional higher layer parameter that could be added is PrecodingandLayerInfoPatternInDCI. The PrecodingandLayerInfoPatternInDCI parameter could be added to notify the UE using several different variables that include at least None, PrecodingandLayerInfo, PrecodingandLayerInfoConfig, PrecodingandLayerInfo/APConfig, PrecodingandLayerInfoAPConfigWithAPfield. For the case of PrecodingandLayerInfoPatternInDCI being equal to "None", this indicates that there is no PrecodingandLayerInfo information the DCI. For the case of PrecodingandLayerInfoPatternInDCI being equal to "PrecodingandLayerInfo", this means that the configuration of the PrecodingandLayerInfo is consistent with a pre-existing configuration, such as that accepted in R15. For the case of PrecodingandLayerInfoPatternInDCI being equal to "PrecodingandLayerInfoConfig", the precoding information and number of layers field value in the DCI is equal to an index defining a particular precoding information or precoding information and the number of layers pattern and the antenna port field value is equal to a particular index defining a particular antenna port pattern. The particular indices may correspond to a row of the precoding information pattern list and a row in the antenna port pattern list, respectively. In some embodiments, the particular indices may correspond to a row or an element number (index) of a list of activated precoding information pattern configurations or a row or an element number (index) in a list of activated antenna port patterns or a row or an element number of a combined list of precoding information pattern configurations and activated antenna port patterns. This may be the case when using RRC signaling and MAC CE.

For the case of PrecodingandLayerInfoPatternInDCI being equal to "PrecodingandLayerInfo/APConfig" the precoding information field value in the DCI may be equal to an index defining a particular combined precoding information pattern and antenna port pattern configuration, for example a row of the combined precoding information pattern and antenna port pattern configuration list. However, the antenna port field in the DCI is disabled and thus has zero bits.

For the case of PrecodingandLayerInfoPatternInDCI being equal to "PrecodingandLayerInfoAPConfigWithAPfield" the antenna port field value in the DCI is equal to an index defining a particular combined precoding information pattern and antenna port pattern configuration, for example a row of the combined precoding information pattern and antenna port pattern configuration list. However, in this case, the precoding information or precoding information and number of layers field in the DCI is disabled and thus has zero bits. A benefit of this alternative over the previous alternative is that the antenna port field in the conventional DCI has a larger number of bits than the precoding information field and can therefore support additional configurations.

A list of precoding information pattern configurations, antenna pattern configurations or combined precoding information pattern and antenna port pattern configurations can be provided to the UE by RRC signaling alone or by RRC signaling and activating or deactivating particular configurations using MAC CE.

The DCI can be used to provide the UE with a selection of the precoding information pattern, the AP pattern, or the combined precoding information pattern and AP pattern configuration, by RRC signaling, or provided by RRC signaling and then activated with MAC CE. The UE can interpret the contents of the TCI field in the DCI to be a precoding information pattern based upon a precoding information pattern configuration index or can interpret the contents of the AP field in the DCI to be an AP pattern based upon an AP pattern configuration index. FIG. 14 illustrates an example of a precoding information pattern configuration in a precoding information field of a DCI and an AP pattern configuration in an AP field of a DCI.

A precoding information pattern configuration index or an AP pattern configuration can be a row in a list, providing information on a precoding information pattern or AP pattern, or both, to be used in PUSCH repetitions. If the pattern length is shorter than a number of PUSCH repetitions, then the pattern is repeated. If the pattern length is longer than a number of repetitions, than a number less than the pattern length of precoding information or AP values, i.e. a number equal to the number of repetitions, is used of the precoding information pattern or AP pattern. If the combined precoding information pattern and AP pattern configurations are used, only either AP value or precoding information is provided in the DCI. This information is signaled to the UE by RRC signaling based on the lone field being used in the DCI, either AP field or precoding information field. For example, if the AP field is being used to signal the combined precoding information pattern and AP pattern configuration, then the PrecodingandLayerInfoPatternInDCI parameter is disabled so that no precoding information is included in the DCI. In some embodiments, a higher layer parameter can be used to notify whether or not the AP pattern is present, e.g. AP-PresentInDCI, which could be similar to the operation of tci-PresentInDCI or PrecodingandLayerInfoPatternInDCI, but for indicating that an AP field is present in the DCI. In some embodiments, AP-PresentInDCI parameter indicates the AP info in DCI for uplink or downlink grant or both.

The size of the DCI in terms of bitwidth can also vary based on the number of the precoding information pattern configurations, the number of active precoding information pattern configurations or AP pattern configurations, or the number of active AP pattern configurations, in the list of precoding information pattern configurations or AP pattern configurations. For example, the bitwidth equals $\log_2(I)$, where I is the number of the precoding information pattern configurations or AP pattern configurations in the list of precoding information pattern configurations or AP pattern configurations.

The precoding information field in DCI should be interpreted by the UE as a precoding information pattern configuration when either there is RRC signaling of the pattern configuration or the UE is pre-configured with a selection of precoding information patterns. Similarly, the antenna port field in the DCI should be interpreted as an antenna port pattern configuration when either there is RRC signaling of the pattern configuration or the UE is pre-configured with a selection of AP patterns.

If a combined precoding information pattern and antenna port pattern configuration is used, then the UE may interpret using either the precoding information field in the DCI or the antenna port field in the DCI. In some embodiments, if both fields are available to the UE, the AP field may take priority and precoding information field can be discarded, or if both exist, the precoding information field can take priority and the antenna port field can be discarded.

By combining higher layer signaling and DCI, it may be possible to reduce signaling overhead while providing the flexibility of having dynamic signaling to adapt to changing channel conditions.

Predefined Set of Indications Either Known to the UE or Signaled Using Higher Layer Signaling In some embodiments, the UE can be pre-configured with a set of multiple precoding information or precoding information and number of layers patterns. The UE can then be provided with a selection of a particular one of the precoding information patterns from the pre-configured set using the DCI.

In some embodiments, the AP pattern can be provided to the UE using the DCI to provide AP pattern notification. Multiple AP patterns can be provided to the UE using RRC signaling (or RRC signaling and MAC CE) and then the DCI can provide the UE with AP pattern selection information to select a particular pattern. In some embodiments, a higher layer parameter could be used as part of an AP configuration. In some embodiments, a parameter that indicates that there is a precoding information field in the DCI could indicate that there is no precoding information information per se, but does indicate there is AP pattern configuration information in the DCI that can be used by the UE.

In some embodiments, a precoding information pattern is provided to the UE without using the DCI to provide precoding information. The precoding information pattern may be a pre-configured set of activated precoding information of which the UE has knowledge. The precoding information pattern may be provided to the UE using a higher layer parameter as part of a PUSCH configuration. An example of a higher layer parameter could be "PrecodingandLayerInfoPattern" which includes a string of precoding information identifiers to define a pattern such as "precoding information ID1", "precoding information ID2", and so on.

In some embodiments, an AP pattern can be provided to the UE without using the DCI to provide any AP pattern identification. The AP pattern may be pre-configured in the UE. The AP pattern may be provided to the UE using RRC signaling. A higher layer parameter in the CORESET configuration could be used to select a particular pattern of the pre-configured AP patterns known to the UE. A parameter that performs similar to tci-PresentInDCI could be used, called for example AP-PresentInDCI.

It is to be understood that although R15 supports only single layer transmission for PUSCH repetition, the methodologies described can apply to multi-layer transmission. In such a scenario, for each repetition, there could be multiple layers, and for different repetitions different precoding information would be possible. In some embodiments, in the case of a multi-layer repetition, different data layers are transmitted at the UE to different TRPs using different precoders or beams.

It should also be understood that the repetitions can be slot based or non-slot based. Slot based means only a single repetition per slot. Non-slot based means multiple repetitions could occur within one slot, i.e. each repetition occurs in a mini-slot of the slot, or each of the multiple repetitions could occur every multiple slots. In some embodiments, a repetition may occur across a slot boundary, for example over at least a portion of two slots.

It should also be understood that solutions described above, with reference to indications for precoding information, precoding information patterns, AP, or AP patterns being dynamically signaled, semi-statically and dynamically signaled, included in preconfigured associations or signaled in higher layer parameters could be used in combination, where appropriate. For example, in some embodiments, using RRC signaling (or RRC signaling and MAC CE) together with DCI to provide TCI state information to the UE can be used simultaneously with RRC signaling (or RRC signaling and MAC CE) to provide AP information to a given UE. In other embodiments, using DCI for providing precoding information to the UE can be used simultaneously with RRC signaling and MAC CE together with DCI to provide AP information to a given UE.

Figure 15:
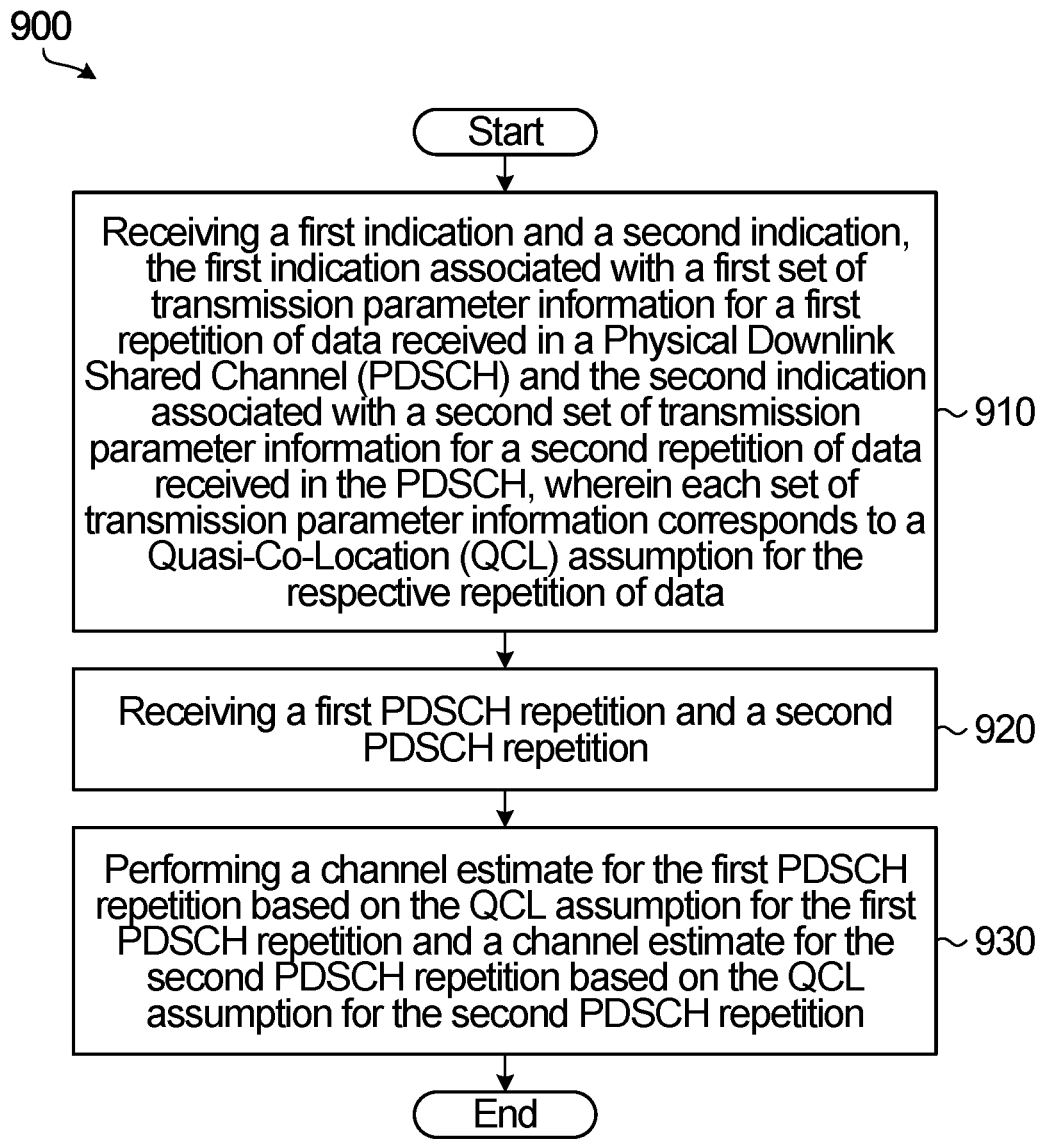
FIG. 15 is a flow chart describing a method for use by an electronic device (ED) in allocating a transmission resource.

FIG. 15 is a flow chart 900 that describes a method according to an aspect of the present application. The method is for implementation by a user equipment (UE), but more generally can apply to any of the ED described above.

Step 910 involves receiving a first indication and a second indication, the first indication associated with a first set of transmission parameter information for a first repetition of data received in a Physical Downlink Shared Channel (PDSCH) and the second indication associated with a second set of transmission parameter information for a second repetition of data transmitted in the PDSCH. Each set of transmission parameter information corresponds to a precoding information for the respective repetition of data. The first indication and the second indication can be received by one of dynamic signaling using downlink control information (DCI), a combination of semi-static signaling and dynamic signaling or a predefined set of indications known to the UE or signaled using higher layer signaling. The predefined fixed association may be specified for example in a telecommunications standard.

Step 920 involves transmitting a first PDSCH repetition based on the first precoding information and a second PDSCH repetition based on the second precoding information.

When the first and second indications are received in a DCI, the DCI may have one of the following formats: format (0_0), also known as a fallback DCI; format (0_1), also known as a normal DCI; or format (0_1), but with a smaller than normal payload, which may be considered a compact DCI.

When receiving the first and second indications by dynamic signaling using DCI, the method may involve receiving a plurality of transmission configuration indications (precoding information), each precoding information indication identifying a precoding information for a respective PDSCH repetition.

When the number of precoding information indications is equal to the total number of PDSCH repetitions, each precoding information indication is associated with a respective PDSCH repetition.

When the number of precoding information indications is less than the total number of PDSCH repetitions, a pattern of precoding information indications associated with the PDSCH repetitions is repeated partially, or more than once, to correspond to the total number of PDSCH repetitions.

When the number of precoding information indications is greater than the total number of PDSCH repetitions, the precoding information indications are used in an order received for each PDSCH repetition until all of the PDSCH repetitions are transmitted.

When receiving the first and second indications by dynamic signaling using DCI, the method may involve receiving a plurality of antenna port (AP) or AP group configuration indications, each AP or AP group configuration indication being associated with a precoding information for a respective PDSCH repetition. When the number of AP or AP group configuration indications is equal to the number of precoding information indications, each AP or AP group configuration indication is associated with a respective precoding information indication. When the plurality of AP or AP group configuration indications is less than a number of precoding information indications, there are least two possible results. If there is only one AP or AP group configuration indication, the same AP or AP group configuration indication is used for each precoding information indication. If there is more than one AP or AP group configuration indication, an association between more than one AP or AP group configuration indication and the precoding information indications is received. When the plurality of AP or AP group configuration indications is greater than a total number of PDSCH repetitions, the precoding information indications are configured in an order received for each respective PDSCH repetition until all of the PDSCH repetitions are transmitted.

Receiving the first indication and the second indication using a combination of semi-static signaling and dynamic signaling may involve receiving a plurality of precoding information pattern configurations, a plurality of AP or AP group pattern configurations, or a plurality of combinations of precoding information pattern configurations and AP or AP group pattern configurations, by higher layer signaling. In some embodiments, an additional step may involve receiving a media access control (MAC) control element (CE) to activate at least one precoding information pattern configuration, at least one AP or AP group pattern configuration, or at least one combination of a precoding information pattern configuration and an AP or AP group pattern configuration.

When receiving the first indication and the second indication using a combination of semi-static signaling and dynamic signaling, the dynamic signaling may involve receiving an indication that a precoding information is included in a DCI to be received by the UE and receiving in the DCI at least one of several different types of indication. A first type of indication includes at least one indication of a precoding information for a respective PDSCH repetition. A second type of indication may include at least one indication of a precoding information pattern that indicates a particular precoding information pattern configuration, an AP or AP group pattern that indicates a particular AP or AP group pattern configuration, or at least one combination of a precoding information pattern configuration and an AP or AP group pattern configuration that indicates a particular precoding information pattern configuration and AP or AP group pattern configuration.

In some embodiments, when the at least one indication is received in a precoding information or precoding information and number of layers field in the DCI, the at least one indication is an index of a table or list, the index associated with a particular precoding information or precoding information and number of layers pattern configuration, a particular AP or AP group pattern configuration, or a particular combination of precoding information pattern and AP or AP group pattern configuration.

Receiving the first indication and the second indication can also involve receiving an identification of a precoding information pattern for identifying a particular precoding information pattern from a plurality of predefined precoding information patterns, each precoding information pattern identifying a set of precoding information, each precoding information corresponding to one of the PDSCH repetitions.

Receiving the first indication and the second indication can also involve receiving a plurality of AP or AP group pattern configurations by higher layer signaling. In some embodiments, an additional step may involve receiving a media access control (MAC) control element (CE) to activate at least one AP or AP group pattern configuration of the plurality of AP or AP group pattern configurations. After the plurality of AP or AP group pattern configurations are received by higher layer signaling, an indication that a precoding information is included in a received DCI may be received. The DCI may include at least one indication of an AP configuration corresponding to an AP or AP group pattern, each AP or AP group pattern associated with precoding information for PDSCH repetitions.

Receiving the first indication and the second indication can also involve: receiving an antenna port (AP) pattern indication identifying a particular AP or AP group pattern from a plurality of predefined AP or AP group patterns, each AP or AP group pattern associated with a precoding information pattern for the PDSCH repetitions.

When receiving an indication of a first instance of a transmission parameter and a second instance of a transmission parameter, the first and second instances of the transmission parameters are each associated with a respective PDSCH repetition.

R15 currently supports two layers with two QCLs in one TCI state associated with two RS ports. It may be possible to utilize such a feature in a scenario in which subsequent transmissions are a version of the first transmission. The UE can be notified of TCI state information or AP information by a higher layer parameter, for example in the PDSCH configuration.

Another transmission parameter that can vary for different transmission links and different repetitions is modulation order. Because transmission links that are associated with different TRPs via different precoding information can have different quality, modulation orders associated with links for different PUSCH repetitions can also be different. For a first repetition, the modulation and coding scheme (MCS), which includes information for both modulation order and code rate, is used to determine a transport block (TB) size for the repetition. For each subsequent repetition, because the TB does not change, it is not necessary to utilize the complete MCS information, only the modulation order. Hence for subsequent repetitions, only modulation order information in the MCS is used. In some embodiments, MCS indices can be used to select MCS information from a preconfigured MCS list or table. The entries in the table that are identified by the indices provide only modulation order information.

Figures 16, 17:
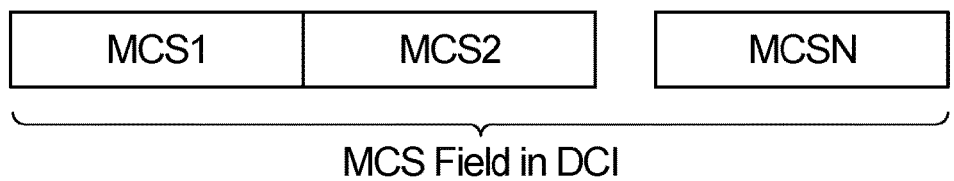
FIG. 16 is a block diagram illustrating an example of modulation order information in a modulation and coding scheme (MCS) field included in DCI according to an aspect of the disclosure.
FIG. 17 is a table illustrating MCS patterns and associated configuration indices according to an aspect of the disclosure.

In some embodiments, modulation order information can be provided to the UE by dynamic signaling using DCI. FIG. 16 illustrates an example of a discrete set of indications in the DCI. A first indication of MCS information in the DCI is MCS1, a second indication of MCS information in the DCI is MCS2 and an Nth indication of MCS information in the DCI is MCSN. The value of N may be a pre-configured value that the UE is aware of or may be provided to the UE by higher layer signaling.

In some embodiments, modulation order information can be provided to the UE by a combination of semi-static signaling (RRC signaling or RRC signaling and MAC CE) and dynamic signaling such as using DCI. The UE can be notified that an MCS field in the DCI should be interpreted as an MCS pattern configuration. UE behaviors, which could be considered UE operating rules, can be defined for associating an MCS pattern with PUSCH repetitions.

FIG. 17 shows an example of MCS patterns. Each pattern is associated with a respective index value. Each row of the table in FIG. 17 includes an MCS pattern and an associated MCS configuration index. The MCS values in the pattern are identified by particular identifiers, i.e. MCS value #. A first row of the table includes an MCS configuration index equal to "0" and an MCS pattern including MCS value1 and MCS value2. A second row of the table includes an MCS configuration index equal to "1" and an MCS pattern including MCS value2 and MCS value3. A third row of the table includes an MCS configuration index equal to "2" and an MCS pattern including MCS value1, MCS value3 and MCS value2. A fourth row of the table includes an MCS configuration index equal to "3" and an MCS pattern including MCS value1, MCS value1, MCS value2 and MCS value2.

It is to be understood that the example table shown in FIG. 17 is not intended to be any way limiting. The number of MCS values in a pattern can vary from 1 to M, where M is a maximum number of MCS values that are allotted for a pattern. Any combination, arrangement or repetition of MCS values could be included in a respective MCS pattern. Although the table in FIG. 17 has only 4 rows, it is to be understood that there could be more or fewer rows in the table.

In some embodiments, modulation order information can be provided to the UE in the form of a pre-configured MCS pattern that is a fixed association. In some embodiments, modulation order information can be provided to the UE by RRC signaling without the DCI.

The demodulation reference signal (DMRS) sequence initialization can be different for different PUSCH repetitions. This can occur when different versions of the same data are sent in different repetitions.

Figures 18, 19:
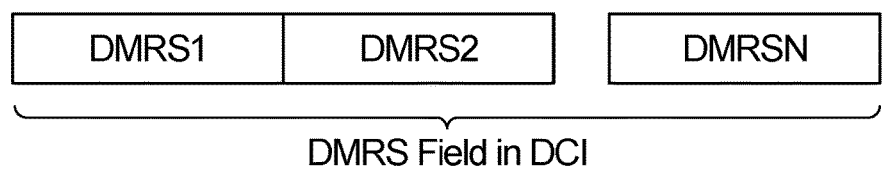
FIG. 18 is a block diagram illustrating an example of a demodulation reference signal (DMRS) sequence initialization indication in a DMRS field included in DCI according to an aspect of the disclosure.
FIG. 19 is a table illustrating DMRS sequence initialization indication patterns and associated configuration indices according to an aspect of the disclosure.

In some embodiments, DMRS sequence initialization information can be provided to the UE by dynamic signaling using DCI. FIG. 18 illustrates an example of a discrete set of DMRS sequence initialization indications in the DCI. A first indication of DMRS sequence initialization information in the DCI is DMRS1, a second indication of DMRS sequence initialization information in the DCI is DMRS2 and an Nth indication of DMRS sequence initialization information in the DCI is DMRSN. The value of N may be a pre-configured value that the UE is aware of or may be provided to the UE by higher layer signaling.

In some embodiments, DMRS sequence initialization information can be provided to the UE by a combination of semi-static signaling (RRC signaling or RRC signaling and MAC CE) and dynamic signaling such as using DCI. The UE can be notified that a DMRS sequence initialization field in the DCI should be interpreted as a DMRS sequence initialization configuration. UE behaviors can be defined for associating a DMRS sequence initialization pattern with PUSCH repetitions.

FIG. 19 shows an example of DMRS sequence initialization patterns for which each pattern is associated with a respective index value. Each row of the table in FIG. 19 includes a DMRS pattern and an associated DMRS configuration index. The DMRS values in the pattern are identified by particular identifiers, i.e. DMRS value #. A first row of the table includes a DMRS configuration index equal to "0" and a DMRS pattern including DMRS value1 and DMRS value1. A second row of the table includes a DMRS configuration index equal to "1" and a DMRS pattern including DMRS value1 and DMRS value3. A third row of the table includes a DMRS configuration index equal to "2" and a DMRS pattern including DMRS value1, DMRS value3 and DMRS value1. A fourth row of the table includes a DMRS configuration index equal to "3" and a DMRS pattern including DMRS value1, DMRS value1, DMRS value1 and DMRS value1.

It is to be understood that the example table shown in FIG. 19 is not intended to be any way limiting. The number of DMRS values in a pattern can vary from 1 to M, where M is a maximum number of DMRS values that are allotted for a pattern. Any combination, arrangement or repetition of MCS values could be included in a respective DMRS pattern. Although the table in FIG. 19 has only 4 rows, it is to be understood that there could be more are less rows in the table.

In some embodiments, DMRS sequence initialization information can be provided to the UE in the form of a pre-configured DMRS sequence initialization pattern that is a fixed association. In some embodiments, DMRS sequence initialization information can be provided to the UE by RRC signaling without the DCI.

Solutions that are described above for use in facilitating PUSCH repetitions to multiple TRPs using multiple precoders or beams with the intent of improving reliability of the PUSCH with regard to the particular described examples of precoding information or AP values may also apply to other parameter indications provided in to the UE in the DCI. Examples of other parameters indications include, but are not limited to carrier indicator, UL/SUL indicator, bandwidth part indicator, frequency domain resource assignment, time domain resource assignment, frequency hopping flag, redundancy version, $1^{st}$ and $2^{nd}$ downlink assignment index, transmit power control (TPC) command for scheduled PUSCH, code block group (CBG) transmission information (CBGTI), PTRS-DMRS association, information related to transport block, HARQ process number, downlink assignment index, transmit power control (TPC) command for scheduled physical uplink control channel (PUCCH), PUCCH resource indicator, sounding reference signal (SRS) request, SRS resource indicator (for non-codebook based PUSCH transmission), CSI request.

According to another aspect of the present application, there is provided another manner of indicating multiple parameters for different PUSCH repetitions, where the repetitions are to/via more than one TRP or beam. The parameters include, but are not limited to precoding information, APs, and MCSs. In some embodiments, this may involve using multiple DCIs, each DCI indicating a different precoding information for a different PUSCH repetition.

In some embodiments, the multiple DCIs are transmitted at the same time. In some embodiments, the multiple DCIs are transmitted with small time differences between the DCIs. In some embodiments, the multiple DCIs are transmitted at different times. When there is a small or large time difference between the DCIs, the time difference can be either pre-defined or configurable.

In some embodiments, the PUSCH repetitions associated with the DCIs are transmitted at the same time. In some embodiments, the PUSCH repetitions associated with the DCIs are transmitted with small time differences between the DCIs. In some embodiments, the PUSCH repetitions associated with the DCIs at transmitted at different times.

The DCIs for scheduling PUSCHs for the set of repetitions can be transmitted from one TRP or more than one TRP. In some embodiments, the PUSCHs for the set of repetitions can be transmitted to/via one or more than one TRP or beam.

When the PUSCH repetitions associate with the same HARQ process number, with the same time, or the same MCS, or the same Resource allocation (RA) then Chase combining can be used to combine the PUSCH repetitions. When the PUSCH repetitions associate with the same HARQ process number, but different RVs, different MCS and different RA, then incremental redundancy (IR) combining can be used to combine the PUSCH repetitions.

When the PUSCH repetitions associate with different HARQ process numbers, data repetition is done in the higher layer, and there is no HARQ combining in the physical (PHY) layer. However, there is diversity gain. When the UE correctly receives at least one copy of the PUSCH repetition, it can stop receiving or processing additional repetitions.

In some embodiments, the diversity mode indicator indicates a diversity mode for a single diversity domain. For example, the diversity mode indicator may be a repetition mode indicator that indicates a space domain repetition mode.

In some embodiments, rather than having a single diversity mode indicator that indicates a combination of diversity domains, one or more indicators may be used, each associated with one or more diversity domains. For example, in a specific embodiment, a repetition mode indicator is used to indicate a space domain repetition mode. Other diversity domains, for example time and frequency, may have their own separate indications.

In some embodiments the diversity indicator value is composed of multiple indicators (that may be transmitted together or separately), one for each of two or more diversity domains. Not necessarily all of the multiple indicators need be transmitted in every instance. For example, the diversity indicator value may include a first field for a repetition mode for space diversity, a second field for frequency diversity, and another field for time diversity.

When multiple indicators are transmitted, this can be used to indicate a specific repetition mode using a combination of diversity domains. For example, a repetition mode indicator for the space domain repetition mode may indicate two repetitions from separate transmit receive points. The same repetition mode indicator for the space domain repetition mode in combination with a repetition mode indicator for frequency indicating two repetitions in frequency, together may indicate four repetitions that include two repetitions from each of two transmit receive points. The two repetitions from a given transmit receive point use each of two different frequency resources.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method for data repetition, the method comprising:
setting a first repetition mode indicator to indicate whether or not space domain repetition should be used;
setting a second repetition mode indicator to indicate whether or not frequency domain repetition should be used, or setting a second repetition mode indicator to indicate whether or not time domain repetition should be used; and
transmitting or receiving at least one repetition of a wireless transmission according to the first repetition mode indicator and the second repetition mode indicator.

2. The method of claim 1 wherein:
setting a second repetition mode indicator to indicate whether or not frequency domain repetition should be used, or setting a second repetition mode indicator to indicate whether or not time domain repetition should be used comprises setting a second repetition mode indicator to indicate whether or not time domain repetition should be used; and
the method further comprising:
setting a third repetition mode indicator to indicate whether or not frequency domain repetition should be used;
wherein said transmitting or receiving said at least one repetition of a wireless transmission is according to the first repetition mode indicator, the second repetition mode indicator and the third repetition mode indicator.

3. The method of claim 1 performed by a transmit receive point (TRP), wherein transmitting or receiving at least one repetition of a wireless transmission according to the first repetition mode indicator and the second repetition mode indicator comprises:
the TRP transmitting at least one frequency diverse repetition.

4. The method of claim 1 performed by a transmit receive point, the method further comprising:
transmitting the first repetition mode indicator and the second repetition mode indicator.

5. A base station comprising:
a processor;
a memory containing instructions for causing the base station to implement a method comprising:
setting a first repetition mode indicator to indicate whether or not space domain repetition should be used mode;
setting a second repetition mode indicator to indicate whether or not frequency domain repetition should be used, or setting a second repetition mode indicator to indicate whether or not time domain repetition should be used; and
transmitting or receiving at least one repetition of a wireless transmission according to the first repetition mode indicator and the second repetition mode indicator.

6. The base station of claim 5, the memory further containing instructions for causing the base station to:
set a second repetition mode indicator to indicate whether or not frequency domain repetition should be used, or setting a second repetition mode indicator to indicate whether or not time domain repetition should be used comprises setting a second repetition mode indicator to indicate whether or not time domain repetition should be used; and set a third repetition mode indicator to indicate whether or not frequency domain repetition should be used;

wherein said transmit or receiving said at least one repetition of a wireless transmission is according to the first repetition mode indicator, the second repetition mode indicator and the third repetition mode indicator.

7. The base station of claim 5 wherein the base station is configured to transmit, by the user equipment, or receive, by the user equipment, said at least one repetition of a wireless transmission according to the first repetition mode indicator and the second repetition mode indicator by transmitting at least one frequency diverse repetition.

8. The base station of claim 5, the memory further containing instructions for causing the base station to:

transmit the first repetition mode indicator and the second repetition mode indicator.

9. A user equipment comprising:

a processor;

a memory containing instructions for causing the user equipment to implement a method comprising:

setting a first repetition mode indicator to indicate whether or not space domain repetition should be used;

setting a second repetition mode indicator to indicate whether or not frequency domain repetition should be used, or setting a second repetition mode indicator to indicate whether or not time domain repetition should be used; and transmitting or receiving at least one repetition of a wireless transmission according to the first repetition mode indicator and the second repetition mode indicator.

10. The user equipment of claim 9, the memory further containing instructions for causing the user equipment to:

set a second repetition mode indicator to indicate whether or not frequency domain repetition should be used, or setting a second repetition mode indicator to indicate whether or not time domain repetition should be used comprises setting a second repetition mode indicator to indicate whether or not time domain repetition should be used; and set a third repetition mode indicator to indicate whether or not frequency domain repetition should be used;

wherein said transmit or receive said at least one repetition of a wireless transmission is according to the first repetition mode indicator, the second repetition mode indicator and the third repetition mode indicator.

11. The user equipment of claim 10, the user equipment further configured to receive, by the user equipment, the first repetition mode indicator and the second repetition mode indicator.

12. The user equipment of claim 9 wherein transmitting, by the user equipment, or receiving, by the user equipment, said at least one repetition of a wireless transmission according to the first repetition mode indicator and the second repetition mode indicator comprises when the first repetition mode indicator indicates space domain repetition should be used, receiving, by the user equipment, two spatially diverse repetitions.

13. The user equipment of claim 9 wherein transmitting, by the user equipment, or receiving, by the user equipment, said at least one repetition of a wireless transmission according to the first repetition mode comprises:

when the second repetition mode indicator indicates frequency domain repetition should be used, receiving, by the user equipment two repetitions using two different frequency resources.

14. The user equipment of claim 9 wherein transmitting, by the user equipment, or receiving, by the user equipment, said at least one repetition of a wireless transmission according to the first repetition mode and the second repetition mode indicator comprises when the second repetition mode indicator indicates time domain repetition should be used, receiving, by the user equipment, two repetitions using two different time resources.

15. A method for data repetition, the method comprising:

receiving, by a user equipment, a first repetition mode indicator to indicate whether or not space domain repetition should be used;

setting a second repetition mode indicator to indicate whether or not frequency domain repetition should be used, or setting a second repetition mode indicator to indicate whether or not time domain repetition should be used; and transmitting, by the user equipment, or receiving, by the user equipment, at least one repetition of a wireless transmission according to the first repetition mode indicator and the second repetition mode indicator.

16. The method of claim 15, wherein transmitting, by the user equipment, or receiving, by the user equipment, said at least one repetition of a wireless transmission according to the first repetition mode indicator and the second repetition mode indicator comprises:

when the first repetition mode indicator indicates space domain repetition should be used, receiving, by the user equipment, two spatially diverse repetitions.

17. The method of claim 15, wherein transmitting, by the user equipment, or receiving, by the user equipment, said at least one repetition of a wireless transmission according to the first repetition mode indicator and the second repetition mode indicator comprises:

when the second repetition mode indicator indicates frequency domain repetition should be used, receiving, by the user equipment, two repetitions using two different frequency resources.

18. The method of claim 15, wherein transmitting, by the user equipment, or receiving, by the user equipment, said at least one repetition of a wireless transmission according to the first repetition mode and the second repetition mode indicator comprises:

when the second repetition mode indicator indicates time domain repetition should be used, receiving, by the user equipment, two repetitions using two different time resources.

19. The method of claim 15, the method further comprising:

receiving, by the user equipment, the first repetition mode indicator and the second repetition mode indicator.

20. The method of claim 15 wherein:

setting a second repetition mode indicator to indicate whether or not frequency domain repetition should be used, or setting a second repetition mode indicator to indicate whether or not time domain repetition should be used comprises setting a second repetition mode indicator to indicate whether or not time domain repetition should be used; and the method further comprising:

setting a third repetition mode indicator to indicate a frequency domain repetition mode;

wherein said transmitting or receiving said at least one repetition of a wireless transmission is according to the first repetition mode indicator, the second repetition mode indicator and the third repetition mode indicator.

* * * * *